US010805806B2

(12) United States Patent
Kato et al.

(10) Patent No.: US 10,805,806 B2
(45) Date of Patent: Oct. 13, 2020

(54) SHARED FREQUENCY MANAGEMENT SYSTEM AND SHARED FREQUENCY MANAGEMENT METHOD

(71) Applicant: Panasonic Intellectual Property Management Co., Ltd., Osaka (JP)

(72) Inventors: Osamu Kato, Fukuoka (JP); Hideki Kanemoto, Kanagawa (JP); Hiroaki Asano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/579,194

(22) Filed: Sep. 23, 2019

(65) Prior Publication Data
US 2020/0245151 A1 Jul. 30, 2020

(30) Foreign Application Priority Data
Jan. 29, 2019 (JP) ................................. 2019-013447

(51) Int. Cl.
*H04W 16/14* (2009.01)
(52) U.S. Cl.
CPC .................................. *H04W 16/14* (2013.01)
(58) Field of Classification Search
CPC .......................... H04W 28/0983; H04W 16/14
See application file for complete search history.

(56) References Cited

U.S. PATENT DOCUMENTS

2006/0083205 A1* 4/2006 Buddhikot ............ H04W 28/16
370/338
2015/0119014 A1* 4/2015 Muraoka ............. H04W 52/367
455/418

OTHER PUBLICATIONS

Fujii et al., "Dynamic Frequency Allocation Using Spectrum Database," Spotlight, *Journal of the ITU Association of Japan*, 45(9), Sep. 2015, 12 pages.
Fujii et al., "Smart Spectrum for FutureWirelessWorld," Invited Paper, *Special Issue on the Past, Present, and Future of Communications Technologies in the IEICE*, IEICE Trans. Commun., E100-B(9), Sep. 2017, 13 pages.

* cited by examiner

*Primary Examiner* — Joseph E Dean, Jr.
(74) *Attorney, Agent, or Firm* — Seed IP Law Group LLP

(57) ABSTRACT

A shared frequency management system that manages sharing of frequencies of a shared frequency band mainly used by a first wireless system with a second wireless system, includes an input unit that receives first border information regarding a first border indicating a border of a first region in which a reception level based on transmission of a first wireless signal using the frequencies of the shared frequency band from the first wireless system becomes a defined value, a deriving unit that derives second border information regarding a second border indicating a border of a second region in which a reception level based on transmission of a second wireless signal using the frequencies of the shared frequency band from the second wireless system becomes the defined value, and a permission condition determination unit that determines a sharing permission condition regarding the frequencies of the shared frequency band for the second wireless system on the basis of the first border information and the second border information.

11 Claims, 8 Drawing Sheets

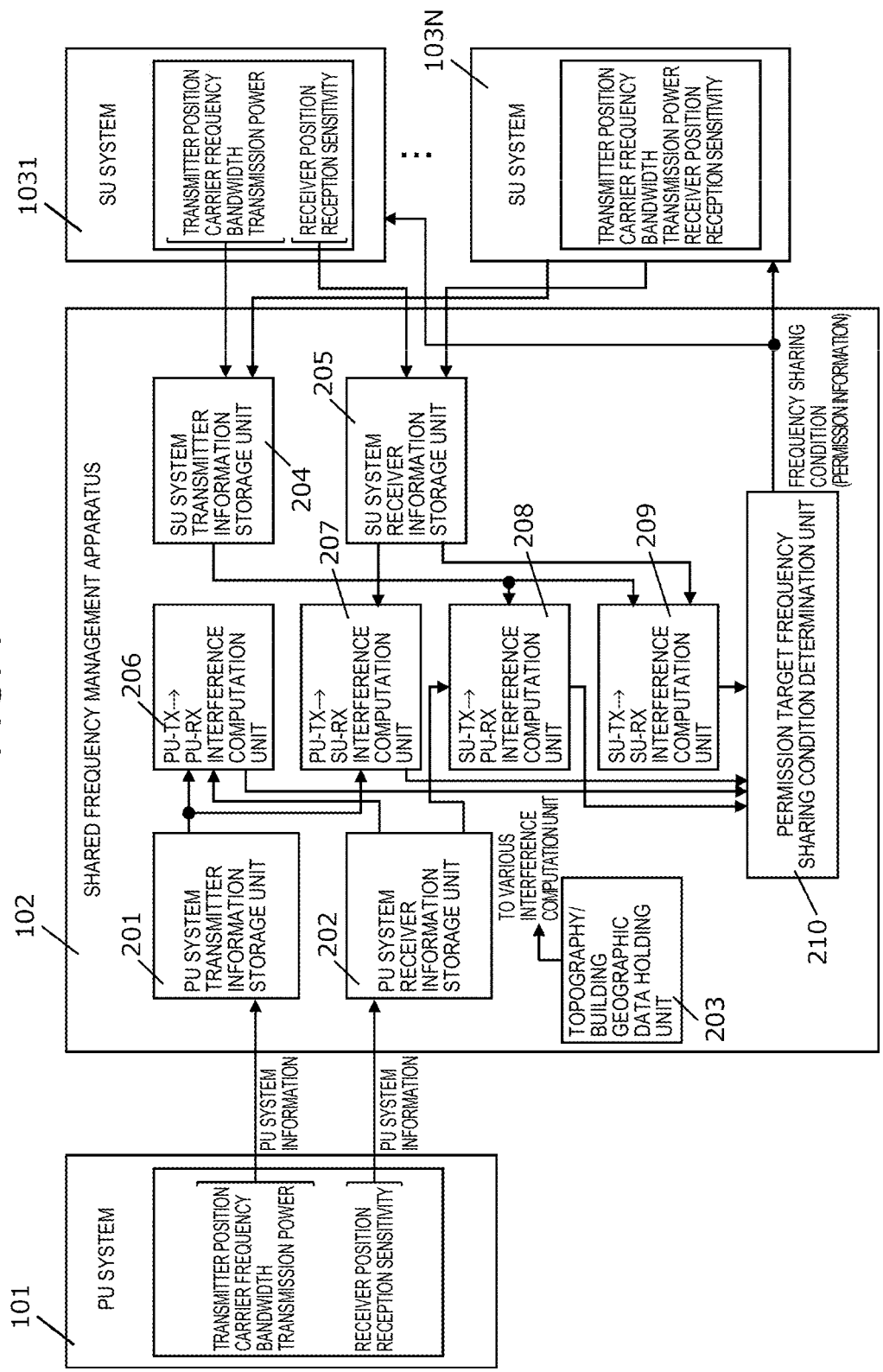

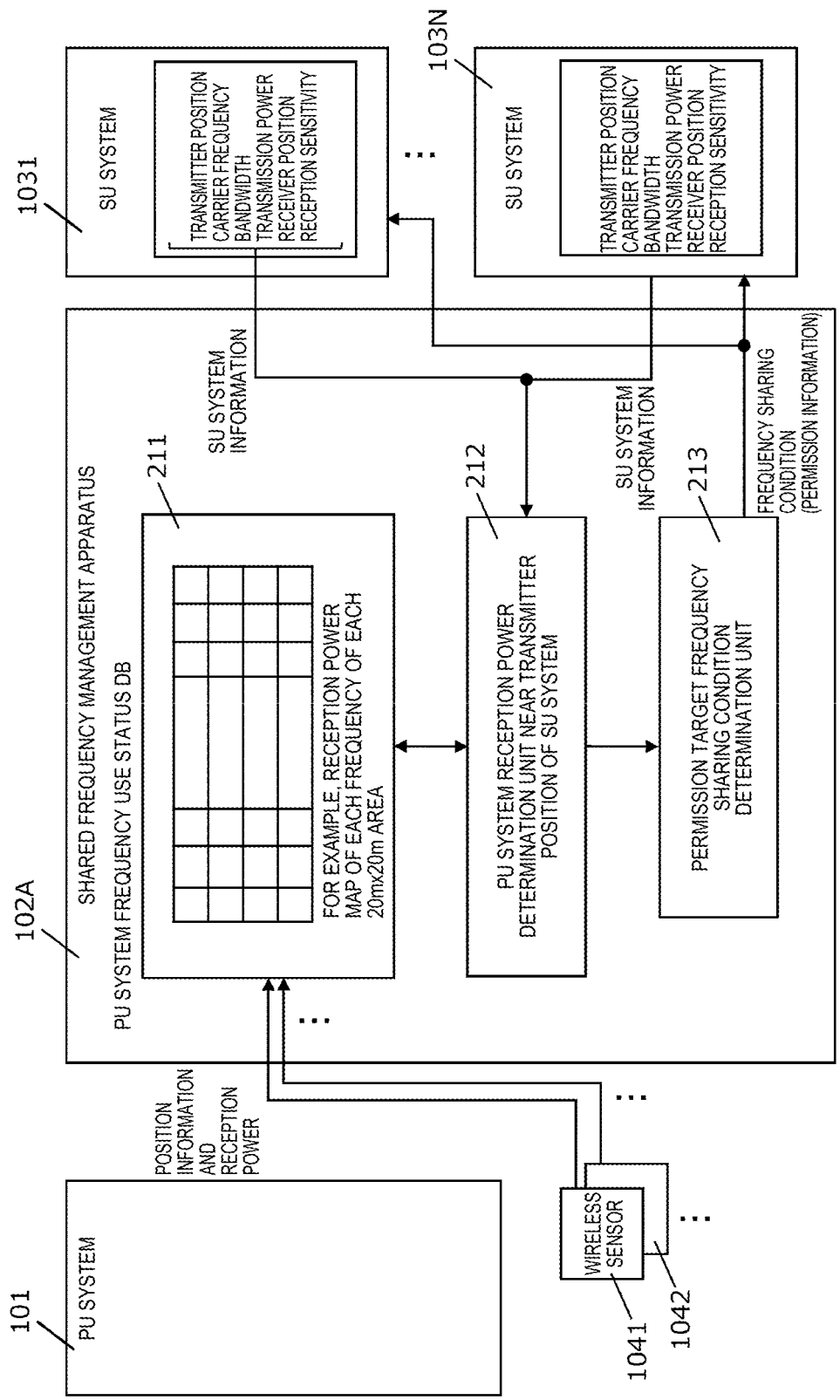

SHARED FREQUENCY MANAGEMENT SYSTEM AND SHARED FREQUENCY MANAGEMENT METHOD

BACKGROUND

1. Technical Field

The present disclosure relates to a shared frequency management system and a shared frequency management method.

2. Description of the Related Art

In recent years, a communication standard for the fifth generation mobile communication system (5G) has been examined, and a frequency band supposed to be used in the 5G has been examined to be shared between an existing wireless system and a new wireless system. In other words, a frequency band that is substantially exclusively used in the existing wireless system has been prompted to be partially selected in the new wireless system, and thus a structure for increasing the use efficiency of a frequency as a whole has been examined. In the following specification, the existing wireless system will be referred to as a "primary user (PU) system", and the new wireless system will be referred to as a "secondary user (SU) system". Regarding a frequency sharing condition, there may be a condition in which the PU system is not influenced by interference due to the use of a frequency in the SU system.

In order to satisfy this condition, as a first approach, a method is disclosed in which a third-party shared frequency management organization performs interference computation due to frequency sharing on the basis of position information of each of a wireless device of the PU system and a wireless device of the SU system (refer to FIG. 7), determines conditions (for example, a frequency and transmission power) for permitting the SU system to use a frequency on the basis of the computation result, and notifies the SU system of the condition (for example, refer to Takeo FUJII et al., "Smart Spectrum for Future Wireless World", The Institute of Electronics, Information and Communication Engineers, IEICE TRANS. COMMUN., VOL. E100-B, NO. 9 Sep. 2017).

Takeo FUJII et al., "Smart Spectrum for Future Wireless World", The Institute of Electronics, Information and Communication Engineers, IEICE TRANS. COMMUN., VOL. E100-B, NO. 9 Sep. 2017 discloses, as a second approach, a technique in which reception level measurement results in a huge number of sensors (for example, wireless terminals such as smart phones of the public) are collected as regards in what extent of reception level a shared frequency is observed at each position, so as to be made into database, and thus a database of a reception level for each environment (position) is built as a result of taking into consideration the influence of an actual building or the like compared with the interference computation (refer to FIG. 8). A management organization that operates and manages the database notifies the SU system of a use condition regarding a shared frequency according to a position of the SU system by referring to the database.

SUMMARY

However, in the first approach, an amount of interference computation between the wireless device of the PU system and the wireless device of the SU system is enormous, and thus a considerably high load is applied to the management organization side in a computation process. In order to obtain an interference amount by reducing an error with actual measurement, it is necessary to take into consideration the presence of a building between a wireless device of a PU system and a wireless device of an SU system or a peripheral building, but interference computation is further enormous in a case where the presence of a building or the like is taken into consideration, and thus this is not realistic. On the other hand, in order not to underestimate an interference amount from a wireless device of an SU system to a wireless device of a PU system by not taking into consideration the presence of a building or the like, a radio wave path between the wireless devices may be predicted and assumed to be a propagation path (that is, free space propagation), and interference computation may be performed. In this method, the SU system is required to be present at a position considerably far away from the PU system, and thus the extent of efficient frequency use through frequency sharing that is an original purpose is reduced.

In the second approach, a huge number of wireless sensors are required to create a database. In the method depending on interference level sensing and measured value reporting using smart phones of the public, a required number of dedicated wireless sensors may be reduced, but it is uncertain how much cooperation of the smart phones of the public can be obtained, and the method depending on smart phones has a problem in lacking in certainty as means for creating a database when sparseness of the presence density of the smart phones is considered. In the first and second approaches, it is fully conceivable that each of a plurality of SU systems is present in the vicinity. Thus, when a condition for permitting each SU system to use a shared frequency is determined, there is a high probability that a frequency permitted to be used by each SU system may be finely divided, and thus a division loss occurs regardless of an actual operation of using the permitted frequency in each SU system. It is assumed that, for example, shared frequencies permitted to be used by an SU system through interference computation with a PU system are a first carrier frequency, a second carrier frequency, a third carrier frequency, and a fourth carrier frequency. In this case, when the first carrier frequency is allocated to a first SU system, the second carrier frequency is allocated to a second SU system, and the third and fourth carrier frequencies are allocated to a third SU system, the division loss is a problem that, even though a use ratio of the second carrier frequency of the second SU system is low, the other SU systems (that is, the first and third SU systems) cannot use the second carrier frequency.

The present disclosure has been devised in consideration of the circumstances of the related art, and an object thereof is to provide a shared frequency management system and a shared frequency management method capable of easily managing permission of an SU system's use of at least some shared frequencies preferentially usable by a PU system without performing complicated interference computation, and thus suppressing a reduction in use efficiency of the shared frequencies.

According to the present disclosure, there is provided a shared frequency management system that manages sharing of frequencies of a shared frequency band mainly used by a first wireless system with a second wireless system, the shared frequency management system including an input unit that receives first border information regarding a first border indicating a border of a first region in which a reception level based on transmission of a first wireless signal using the frequencies of the shared frequency band from the first wireless system becomes a defined value; a deriving unit that derives second border information regarding a second border indicating a border of a second region in which a reception level based on transmission of a second wireless signal using the frequencies of the shared frequency band from the second wireless system becomes the defined value; and a permission condition determination unit that determines a sharing permission condition regarding the frequencies of the shared frequency band for the second wireless system on the basis of the first border information and the second border information.

According to the present disclosure, there is provided a shared frequency management method of managing sharing of frequencies of a shared frequency band mainly used by a first wireless system with a second wireless system, the shared frequency management method including receiving first border information regarding a first border indicating a border of a first region in which a reception level based on transmission of a first wireless signal using the frequencies of the shared frequency band from the first wireless system becomes a defined value; deriving second border information regarding a second border indicating a border of a second region in which a reception level based on transmission of a second wireless signal using the frequencies of the shared frequency band from the second wireless system becomes the defined value; and determining a sharing permission condition regarding the frequencies of the shared frequency band for the second wireless system on the basis of the first border information and the second border information.

According to the present disclosure, it is possible to easily manage permission of an SU system's use of at least a part of a shared frequency preferentially usable by a PU system without requiring complicated interference computation, and thus to suppress a reduction in use efficiency of the shared frequency.

BRIEF DESCRIPTION OF THE DRAWINGS

FIG. 7 is a configuration diagram illustrating a shared frequency management system corresponding to a first approach in the related art; and FIG. 8 is a configuration diagram illustrating a shared frequency management system corresponding to a second approach in the related art.

DETAILED DESCRIPTION

Figure 1:
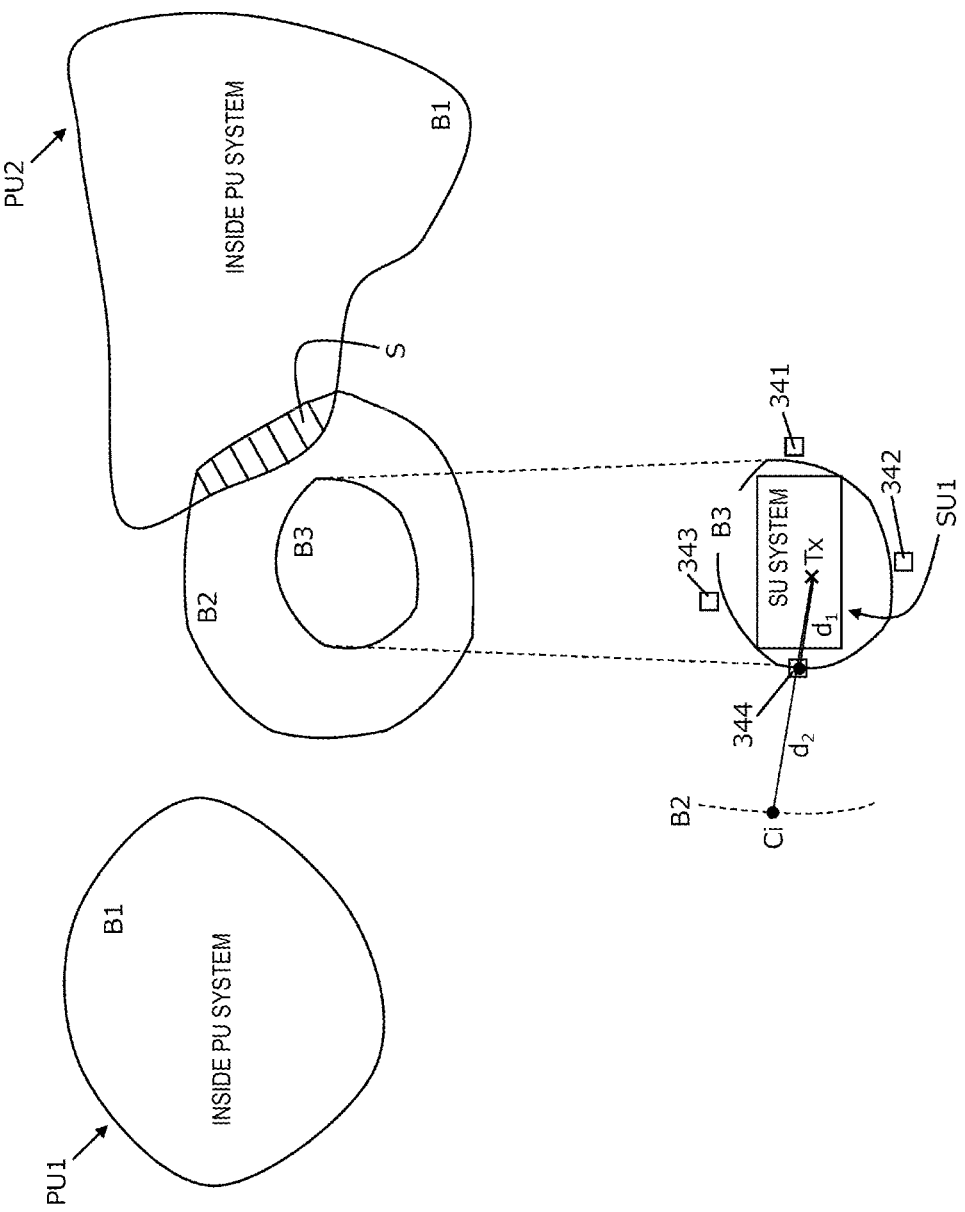
FIG. 1 is a diagram illustrating concepts of a first border, a second border, and a third border.

Details leading to contents of Exemplary Embodiment 1

First, as the related art that is a basis of a shared frequency management system according to the present disclosure, the concept of shared frequency management based on two types of approaches will be described with reference to FIGS. 7 and 8. FIG. 7 is a configuration diagram illustrating a shared frequency management system corresponding to a first approach in the related art. FIG. 8 is a configuration diagram illustrating a shared frequency management system corresponding to a second approach in the related art.

First Approach in the Related Art

A shared frequency management system illustrated in FIG. 7 is configured to include PU system 101, shared frequency management apparatus 102, and a plurality of (for example, N: an integer of 2 or greater) SU systems 1031, ..., and 103N. PU system 101 and shared frequency management apparatus 102 can perform transmission and reception of data or information therebetween. Similarly, shared frequency management apparatus 102 and each of SU systems 1031 to 103N can perform transmission and reception of data or information therebetween.

PU system 101 is a wireless system that is controlled to be operated by a system operator (a so-called primary user) to whom a frequency of a predetermined shared frequency band is allocated to be mainly or substantially exclusively used. PU system 101 has one or more transmitters (not illustrated) and receivers (not illustrated) required to operate PU system 101, and holds PU system information required to operate PU system 101. Here, the PU system information includes information regarding transmission such as a transmitter position, a carrier frequency (center frequency), a bandwidth, and transmission power, and information regarding reception such as a receiver position and a reception sensitivity.

Shared frequency management apparatus 102 is configured to include PU system transmitter information storage unit 201, PU system receiver information storage unit 202, topography/building geographic data holding unit 203, SU system transmitter information storage unit 204, SU system receiver information storage unit 205, PU-TX→PU-RX interference computation unit 206, PU-TX→SU-RX interference computation unit 207, SU-TX→PU-RX interference computation unit 208, SU-TX→SU-RX interference computation unit 209, and permission target frequency sharing condition determination unit 210.

Each of SU systems 1031 to 103N is a wireless system that applies to shared frequency management apparatus 102 for conditional use of some frequencies of a predetermined shared frequency band that is mainly or exclusively usable by PU system 101. Each of SU systems 1031 to 103N has one or more transmitters (not illustrated) and receivers (not illustrated) required to operate SU systems 1031 to 103N, and holds SU system information required to operate SU systems 1031 to 103N. Here, the SU system information includes information regarding transmission such as a transmitter position, a carrier frequency (center frequency), a bandwidth, and transmission power, and information regarding reception such as a receiver position and a reception sensitivity.

In the first approach in the related art, shared frequency management apparatus 102 preserves information regarding the transmitter of the PU system from PU system 101 in PU system transmitter information storage unit 201, and preserves information regarding the receiver of the PU system from PU system 101 in PU system receiver information storage unit 202. Similarly, shared frequency management apparatus 102 preserves information regarding the transmitter of the SU system from each of SU systems 1031 to 103N in SU system transmitter information storage unit 204, and preserves information regarding the receiver of the SU system from each of SU systems 1031 to 103N in SU system receiver information storage unit 205. Shared frequency management apparatus 102 reads geographic information from topography/building geographic data holding unit 203, and performs various interference computations by using the geographic information in PU-TX→PU-RX interference computation unit 206, PU-TX→SU-RX interference computation unit 207, SU-TX→PU-RX interference computation unit 208, and SU-TX→SU-RX interference computation unit 209.

For example, PU-TX→PU-RX interference computation unit 206 performs interference computation in a signal propagation path from the transmitter of PU system 101 to the receiver of PU system 101. Similarly, PU-TX→SU-RX interference computation unit 207 performs interference computation in a signal propagation path from the transmitter of PU system 101 to the receiver of each of SU systems 1031 to 103N. Similarly, SU-TX→PU-RX interference computation unit 208 performs interference computation in a signal propagation path from the transmitter of each of SU systems 1031 to 103N to the receiver of PU system 101. Similarly, SU-TX→SU-RX interference computation unit 209 performs interference computation in a signal propagation path from the transmitter of each of SU systems 1031 to 103N to the receiver of each of SU systems 1031 to 103N.

Permission target frequency sharing condition determination unit 210 notifies each SU system of a frequency sharing condition (permission information) regarding use of a frequency of a shared frequency band usable by each of SU systems 1031 to 103N on the basis of enormous results of the various interference computations.

In the first approach in the related art, an interference computation amount between a wireless device (for example, the transmitter or the receiver; the same applies hereafter) of PU system 101 and a wireless device (for example, the transmitter or the receiver; the same applies hereafter) of each of SU systems 1031 to 103N becomes enormous, and thus a considerably high load is applied to shared frequency management apparatus 102 in a computation process. In order to obtain an interference amount by reducing an error with actual measurement, it is necessary to take into consideration the presence of a building between the wireless device of PU system 101 and the wireless device of each of SU systems 1031 to 103N or a peripheral building, but interference computation is further enormous in a case where the presence of a building or the like is taken into consideration, and thus this is not realistic. On the other hand, in order not to underestimate an interference amount from the wireless device of each of SU systems 1031 to 103N to the wireless device of PU system 101 by not taking into consideration the presence of a building or the like, a radio wave path between the wireless devices may be predicted and assumed to be a propagation path (that is, free space propagation), and interference computation may be performed. In this method, each of SU systems 1031 to 103N is required to be present at a position considerably far away from PU system 101, and thus the extent of efficient frequency use through frequency sharing that is an original purpose is reduced. In the first approach, when a condition for permitting each of SU systems 1031 to 103N to use a shared frequency is determined in order to avoid interference among a plurality of SU systems present nearby, there is a high probability that a frequency permitted to be used by each of SU systems 1031 to 103N may be finely divided, and thus a division loss occurs regardless of an actual operation of using the permitted frequency in each of SU systems 1031 to 103N. Thus, the extent of efficient frequency use through frequency sharing that is an original purpose is also reduced due to the division loss.

Second Approach in the Related Art

A shared frequency management system illustrated in FIG. 8 is configured to include PU system 101, shared frequency management apparatus 102A, a plurality of (for example, N: an integer of 2 or greater) SU systems 1031, . . . , and 103N, and a plurality of wireless sensors 1041, 1042, . . . . In description of FIG. 8, the same configuration as the configuration illustrated in FIG. 7 is given the same reference numeral, and a description thereof will be made briefly or will be omitted, and different contents will be described. Wireless sensors 1041, 1042, . . . and shared frequency management apparatus 102A can perform transmission and reception of data or information therebetween. Similarly, shared frequency management apparatus 102A and each of SU systems 1031 to 103N can perform transmission and reception of data or information therebetween. On the other hand, PU system 101 and shared frequency management apparatus 102A cannot perform transmission and reception of data or information therebetween.

Shared frequency management apparatus 102A is configured to include PU system frequency use status DB 211, a unit determining PU system reception power near transmitter position of SU system 212 (hereinafter, simply referred to as PU system reception power determination unit 212), and permission target frequency sharing condition determination unit 213.

Each of wireless sensors 1041, 1042, . . . is disposed at each location of a communication area in which a wireless service from PU system 101 can be received. Wireless sensors 1041, 1042, . . . are, for example, installation type wireless sensors, smart phones owned by a plurality of respective unspecified general users movable in a communication area of PU system 101, or on-vehicle wireless sensors in vehicles on which a plurality of respective unspecified general users movable in the communication area of PU system 101 ride. Each of wireless sensors 1041, 1042, . . . measures reception power of a signal transmitted due to a wireless service from PU system 101 at the disposition location, and sends a report content in which a measurement result including position information of the wireless sensor and frequency information of the received signal are correlated with each other to shared frequency management apparatus 102A.

In the second approach in the related art, in a case where the report content (specifically, a measurement result of reception power including position information of the wireless sensor and frequency information of a received signal) transmitted from each of wireless sensors 1041, 1042, . . . is received, shared frequency management apparatus 102A generates a reception power map illustrated in FIG. 8. The reception power map is generated for each small area of, for example, 20 m×20 m with respect to the overall communication area of PU system 101, and is a heat map two-dimensionally indicating a measurement result of reception power for each frequency of a received signal in the small area. Shared frequency management apparatus 102A updates the reception power map when the reception power map is generated, and preserves the reception power map in PU system frequency use status DB 211.

PU system reception power determination unit 212 receives SU system information (refer to FIG. 7) including an application for use of some frequencies of a shared frequency band that is mainly or substantially exclusively usable by PU system 101 from each of SU systems 1031 to 103N. PU system reception power determination unit 212 acquires a measurement result of reception power of PU system 101 in a use target area of a corresponding SU system on the basis of the SU system information from each of SU systems 1031 to 103N, and outputs the measurement result to permission target frequency sharing condition determination unit 213.

Permission target frequency sharing condition determination unit 213 notifies each SU system of a frequency sharing condition (permission information) regarding use of a frequency of the shared frequency band usable by each of SU systems 1031 to 103N on the basis of the output from PU system reception power determination unit 212.

In the second approach in the related art, it is determined whether or not a frequency of a shared frequency band is usable on the basis of an actually measured value of reception power that is actually measured, and thus it is estimated that a status can be recognized with high accuracy compared with the first approach. However, in the second approach, a huge number of wireless sensors are required to create a database. In the method depending on interference level sensing and measured value reporting using smart phones of the public, a required number of dedicated wireless sensors may be reduced, but it is uncertain how much cooperation of the smart phones of the public can be obtained, and the method depending on smart phones has a problem in lacking in certainty as means for creating a database when sparseness of the presence density of the smart phones is considered. In the second approach, when a condition for permitting each of SU systems 1031 to 103N to use a shared frequency is determined in order to avoid interference among a plurality of SU systems present nearby, there is a high probability that a frequency permitted to be used by each of SU systems 1031 to 103N may be finely divided, and thus a division loss occurs regardless of an actual operation of using the permitted frequency in each of SU systems 1031 to 103N. Thus, in the same manner as in the first approach, the extent of efficient frequency use through frequency sharing that is an original purpose is also reduced due to the division loss.

Therefore, in the following exemplary embodiments, a description will be made of examples of a shared frequency management system and a shared frequency management method capable of easily managing permission of an SU system's use of at least a part of a shared frequency preferentially usable by a PU system without requiring complicated interference computation, and thus suppressing a reduction in use efficiency of the shared frequency.

Hereinafter, a detailed description will be made of exemplary embodiments in which a configuration and an operation of a shared frequency management system and a shared frequency management method according to the present disclosure are specifically disclosed with reference to the drawings as appropriate. However, a detailed description more than necessary may be omitted. For example, a detailed description of a well-known content or a repeated description of a substantially identical configuration may be omitted. This is for a person skilled in the art's better understanding by avoiding unnecessary redundancy in the following description. The accompanying drawings and the following description are provided for a person skilled in the art to fully understand the present disclosure, and are not intended to limit the subject disclosed in the claims.

Exemplary Embodiment 1

Hereinafter, a frequency band (hereinafter, referred to as a "shared frequency band") of which a frequency is shared by the shared frequency management system is set to a frequency of 20 GHz or higher, and, for example, the 25 GHz to 27 GHz band that is a high frequency band allocated to fixed wireless access (FWA) systems of which the number is only several thousands in Japan or the 27 GHz to 29.5 GHz band that is a high frequency band allocated to fixed satellite telecommunication services will be exemplified. Such frequencies have characteristics that a radio wave arrival distance is a small distance of, for example, about 100 m, and it is difficult for a radio wave to be diffracted by or transmitted through a shield such as a building. The shared frequency band is supposed to be used in the fifth generation mobile communication system (5G) at present, and may be a frequency band suitable for wireless communication in a communication area of an SU system operated by a secondary user who is a subsequent user. For example, in a fixed wireless access system in the 26 GHz band, a bandwidth (BW) is 60 MHz, and there are 26 carrier frequencies. In this case, k indicating an ordinal number of a carrier frequency $f_k$ is any one of integer values of 1 to 26.

In the following exemplary embodiment, the shared frequency management system recognizes a reception power distribution of a wireless signal in each time period and each location based on transmission power of a PU system. A limitation to be observed in the use of a shared frequency is that transmission power of an SU system does not give interference of a reception sensitivity or more of a PU system to the inside of a border (a first border; refer to FIG. 1) at which reception power of a transmitted wireless signal becomes the reception sensitivity of the PU system. The first border will be described later in detail, and differs for each carrier frequency $f_k$.

For example, in an SU system scheduled to use a frequency of the 26 GHz band indoors, an area in which a transmitter and a receiver (including an access point) capable of performing wireless communication coping with the SU system can be present is a default restricted area in which a wireless service of the SU system is received (a third border; refer to FIG. 1). The restricted area is, for example, a company site, a university campus, a hospital, an amusement park, a factory, a construction site, a station, or a smart town where hundreds of households live, which are only examples, and is not limited thereto. Details of the third border will be described later, and the third border indicates a border line of a restricted area (that is, a closed space area) in which a wireless service of an SU system is received.

Therefore, the shared frequency management system builds reception power of a wireless signal in each time period and each location based on transmission power of an SU system present inside the third border, as a database by using measurement results in one or more radio wave sensors (refer to FIG. 1) provided in the periphery of the closed space area of the SU system, and can thus determine the presence or absence of a frequency of a shared frequency band that can be permitted to be used by the SU system through computation. The radio wave sensors are preferably disposed near the third border. In the computation, the shared frequency management system can perform efficient computation by recognizing a border (a second border; refer to FIG. 1) of a position where the reception power of the wireless signal in each time period and each location based on the transmission power of the SU system becomes a reception sensitivity of a PU system. In other words, in Exemplary Embodiment 1, the concepts of the first border, the second border, and the third border are introduced, and thus a determination of whether or not some frequencies of a shared frequency band allocated to be mainly or substantially exclusively usable by a PU system may be permitted to be used by an SU system can be more easily performed than in the first approach and the second approach in the related art.

FIG. 1 is a diagram illustrating the concepts of first border B1, second border B2, and third border B3. In FIG. 1, for better understanding of description, two PU systems PU1 and PU2 are illustrated, but, in Exemplary Embodiment 1, the number of PU systems is not limited to two.

First, first border B1 will be described.

The shared frequency management system according to Exemplary Embodiment 1 normally recognizes a plurality of reception point positions where reception power of a wireless signal (an example of a first wireless signal) transmitted from a transmitter of each of PU systems PU1 and PU2 becomes a reception sensitivity on the basis of information (for example, a transmission point position, a carrier frequency ($f_k$) or a carrier frequency ($f_k$) number, a bandwidth, and transmission power) regarding a wireless method used in each of PU systems PU1 and PU2 illustrated in FIG. 1. Here, the reception sensitivity (an example of a defined value) is the minimum reception power with which wireless communication is established, and is as follows. In a case where a wireless signal with the carrier frequency $f_k$ is transmitted from a PU system, a border line connecting the plurality of adjacent reception point positions to each other is referred to as the "first border", and is indicated by "B1($f_k$)" in some cases.

Next, second border B2 will be described.

The shared frequency management system according to Exemplary Embodiment 1 normally recognizes a plurality of reception point positions where reception power of a wireless signal (an example of a second wireless signal) transmitted from transmitter Tx of SU system SU1 becomes a reception sensitivity of a PU system (for example, PU system PU2) on the basis of information (for example, restricted area position information, a carrier frequency ($f_k$) or a carrier frequency ($f_k$) number, a bandwidth, transmission power, and reception power measured by a radio wave sensor which will be described later) regarding a wireless method scheduled to be used in SU system SU1. In a case where a wireless signal with carrier frequency $f_k$ is transmitted from SU system SU1, a border line connecting the plurality of adjacent reception point positions to each other is referred to as the "second border", and is indicated by "B2($f_k$)" in some cases. Here, a propagation distance of a radio wave from transmitter Tx of SU system SU1 to reception point position Ci described above is indicated by "$d_2$".

In FIG. 1, overlapping intersection area S is present between a region surrounded by second border B2 and a region surrounded by first border B1 corresponding to PU system PU2, but intersection area S is not present between the region surrounded by second border B2 and a region surrounded by first border B1 corresponding to PU system PU1.

Finally, third border B3 will be described.

Third border B3 is a border line of a restricted area (for example, the exemplified university campus) in which a wireless service of SU system SU1 is received. In Exemplary Embodiment 1, one or more radio wave sensors 341, 342, 343, and 344 are disposed around third border B3. Each of radio wave sensors 341 to 344 measures reception power of a wireless signal based on transmission power from transmitter Tx of SU system SU1, and reports the measured reception power to SU system SU1. Each of radio wave sensors 341 to 344 monitors whether or not actual reception power of a wireless signal using carrier frequency $f_k$ permitted to be used in SU system SU1 complies with reception power defined in a shared frequency use permission condition. Here, a propagation distance of a radio wave from transmitter Tx of SU system SU1 to a radio wave sensor (for example, radio wave sensor 344) is indicated by "$d_1$". Propagation distance "$d_1$" which will be described later in detail is used for computation of propagation distance "$d_2$" corresponding to second border B2.

Figure 2:
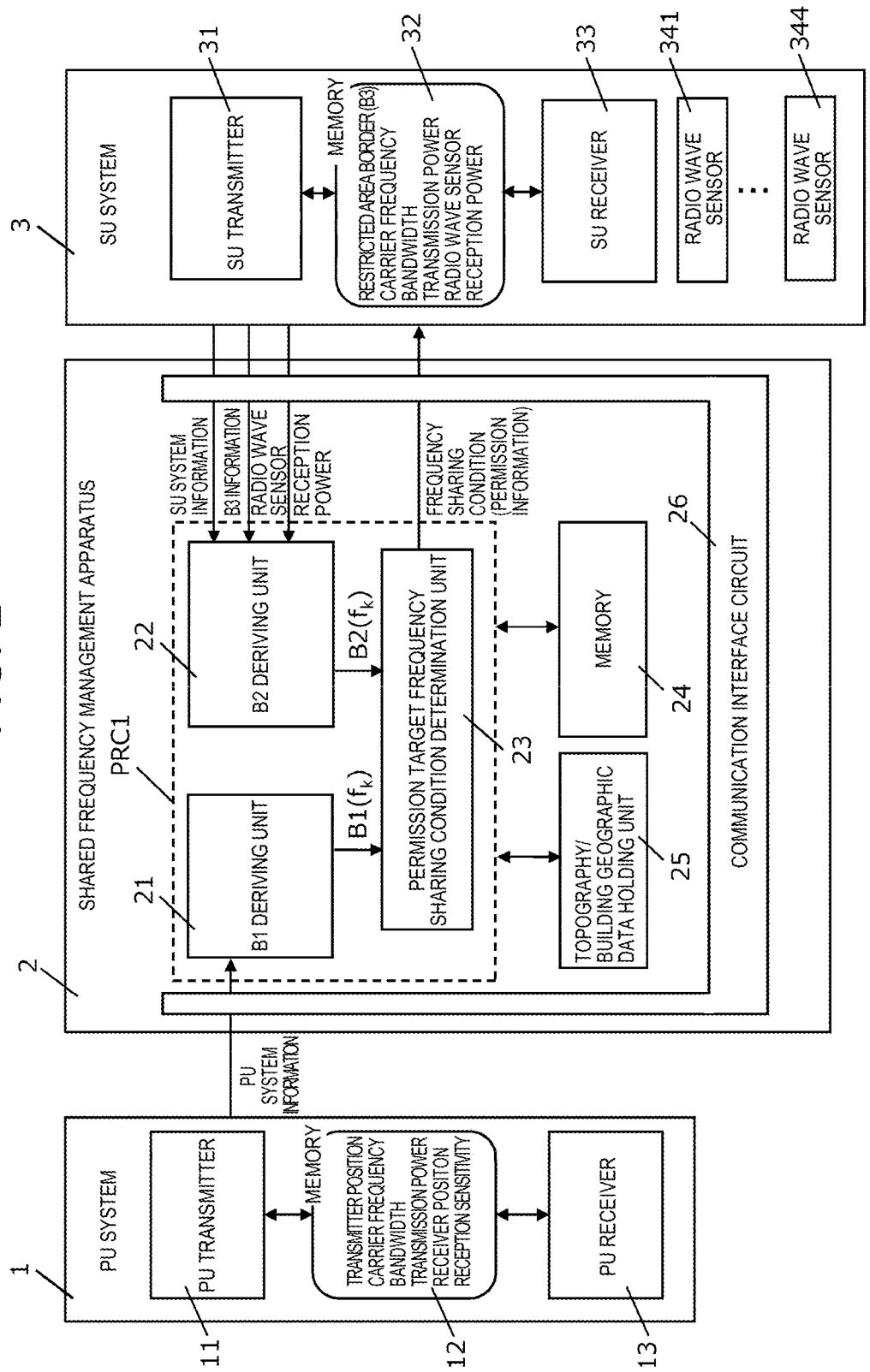
FIG. 2 is a block diagram illustrating an internal configuration example of a shared frequency management system according to Exemplary Embodiment 1.

Next, with reference to FIG. 2, a configuration example of the shared frequency management system according to Exemplary Embodiment 1 will be described. FIG. 2 is a block diagram illustrating an internal configuration example of the shared frequency management system according to Exemplary Embodiment 1. The shared frequency management system according to Exemplary Embodiment 1 is configured to include PU system 1, shared frequency management apparatus 2, SU system 3, and one or more radio wave sensors 341 to 344 (refer to FIG. 1). Each of radio wave sensors 341 to 344 may be included in SU system 3. PU system 1 and shared frequency management apparatus 2 can perform transmission and reception of data or information therebetween. Similarly, shared frequency management apparatus 2 and SU system 3 can perform transmission and reception of data or information therebetween. For better understanding of description, FIG. 2 illustrates only a single SU system 3, but a plurality of SU systems may be provided.

PU system 1 as an example of a first wireless system is a wireless system controlled to be operated by a system operator (a so-called primary user) to whom frequencies (for example, the 20 GHz to the 30 GHz band) of a predetermined shared frequency band are allocated to be mainly or substantially exclusively usable. PU system 1 includes one or more PU transmitters 11, memories 12, and PU receivers 13 required to operate PU system 1. In other words, each of PU transmitter 11 and PU receiver 13 is used to execute a wireless service provided by PU system 1. Memory 12 stores PU system information required to operate PU system 1. Here, the PU system information includes, for example, information regarding transmission such as a transmitter position indicating an installation position of PU transmitter 11, a carrier frequency (center frequency), a bandwidth, and transmission power, and information regarding reception such as a receiver position indicating an installation position of PU receiver 13 and a reception sensitivity.

Shared frequency management apparatus 2 is configured to include B1 deriving unit 21, B2 deriving unit 22, permission target frequency sharing condition determination unit 23, memory 24, topography/building geographic data holding unit 25, and communication interface circuit 26. B1 deriving unit 21, B2 deriving unit 22, and permission target frequency sharing condition determination unit 23 are configured by using processor PRC1 such as a central processing unit (CPU), a digital signal processor (DSP), or a field programmable gate array (FPGA), and are functionally configured by processor PRC1 reading and executing a program stored in memory 24. Details of a configuration of shared frequency management apparatus 2 will be described later. Processor PRC1 functions as a controller controlling an operation of shared frequency management apparatus 2, and performs a control process for totally controlling operations of the respective units of shared frequency management apparatus 2, data input and output processes among the respective units of shared frequency management apparatus 2, a data calculation (computation) process, and a data storage process. Processor PRC1 operates according to a program stored in memory 24. Processor PRC1 uses memory 24 during an operation, and stores data generated by processor PRC1 into memory 24.

SU system 3 as an example of a second wireless system is a wireless system that applies to shared frequency management apparatus 2 for conditional use of some frequencies (for example, the 20 GHz to the 30 GHz band) of the predetermined shared frequency band mainly or substantially exclusively usable by PU system 1. SU system 3 includes one or more SU transmitters 31, memories 32, and SU receivers 33 required to operate SU system 3. In other words, each of SU transmitter 31 and SU receiver 33 is used to execute a wireless service provided by SU system 3. Memory 32 holds SU system information required to operate SU system 3. Here, the SU system information includes, for example, at least a carrier frequency (center frequency), a bandwidth, and transmission power. The SU system information may further include third border B3 indicating a border line of a restricted area in which a wireless service of SU system 3 is received and a measurement result of reception power in a radio wave sensor (for example, radio wave sensor 344).

Each of radio wave sensors 341 to 344 as an example of a sensor measures reception power of a wireless signal based on transmission power from SU transmitter 31 of SU system 3, and reports the measured reception power to SU system 3. The measurement of reception power in each of radio wave sensors 341 to 344 may be performed to monitor whether or not actual reception power of a wireless signal using carrier frequency $f_k$ permitted to be used in SU system 3 by shared frequency management apparatus 2 complies with reception power defined in a shared frequency use condition (will be described later).

Here, details of a configuration of shared frequency management apparatus 2 will be described.

B1 deriving unit 21 acquires the PU system information sent from PU system 1 via communication interface circuit 26, and recognizes the PU system information. B1 deriving unit 21 reads geographic information from topography/building geographic data holding unit 25, and derives B1($f_k$) as an example of first border information regarding the first border corresponding to carrier frequency $f_k$ by using the geographic information and the PU system information. As described above, in a case where a wireless signal with carrier frequency $f_k$ is transmitted from PU system 1, B1($f_k$) indicates a border line connecting reception points where reception power of the wireless signal becomes the reception sensitivity (refer to the above description) of PU system 1, to each other. In other words, B1 deriving unit 21 can derive position information of a region (an example of a first region) surrounded by first border B1. B1 deriving unit 21 outputs the derived first border information to permission target frequency sharing condition determination unit 23.

B2 deriving unit 22 as an example of a deriving unit acquires the SU system information sent from SU system 3 via communication interface circuit 26, and recognizes the SU system information. The SU system information includes, for example, a carrier frequency (center frequency), a bandwidth, transmission power, third border B3 indicating a border line of a restricted area in which a wireless service of SU system 3 is received, and a measurement result of reception power in a radio wave sensor (for example, radio wave sensor 344). B2 deriving unit 22 derives B2($f_k$) as an example of second border information regarding the second border corresponding to carrier frequency $f_k$ through computation (which will be described later) by using the SU system information. As described above, in a case where a wireless signal with carrier frequency $f_k$ is transmitted from SU system 3, B2($f_k$) indicates a border line connecting reception points where reception power of the wireless signal becomes the reception sensitivity (refer to the above description) of PU system 1, to each other. In other words, B2 deriving unit 22 can derive position information of a region (an example of a second region) surrounded by second border B2. B2 deriving unit 22 outputs the derived second border information to permission target frequency sharing condition determination unit 23.

Permission target frequency sharing condition determination unit 23 as an example of an input unit receives first border information (B1($f_k$)) from B1 deriving unit 21 and second border information (B2($f_k$)) from B2 deriving unit 22. Permission target frequency sharing condition determination unit 23 determines a shared frequency use condition (an example of a sharing permission condition) regarding a frequency of a shared frequency band for SU system 3 by using first border information (B1($f_k$)) and second border information (B2($f_k$)) from B2 deriving unit 22. In other words, permission target frequency sharing condition determination unit 23 as an example of a permission condition determination unit transmits a determination result of whether or not SU system 3 is permitted to use carrier frequency $f_k$ to SU system 3 via communication interface circuit 26.

Memory 24 is configured by using a random access memory (RAM) and a read only memory (ROM), and temporarily preserves a program required to perform an operation of shared frequency management apparatus 2, and data or information generated during an operation. The RAM is, for example, a work memory used during an operation of processor PRC1. The ROM stores in advance, for example, a program for controlling processor PRC1.

Topography/building geographic data holding unit 25 as an example of a geographic data holding unit is configured by using a hard disk drive (HDD) or a solid state drive (SSD), and stores geographic information including topographic information and building information in areas where PU system 1 and SU system 3 are installed.

Communication interface circuit 26 is configured by using a communication circuit used to perform transmission and reception of data or information with a network (for example, an intranet or the Internet) connected to shared frequency management apparatus 2. Communication interface circuit 26 performs transmission and reception of data or information with PU system 1 and SU system 3 connected to the network. Communication interface circuit 26 as an example of a notification unit notifies SU system 3 of the shared frequency use condition determined by permission target frequency sharing condition determination unit 23.

Here, a detailed description will be made of a computation example for deriving second border information (B2($f_k$)) in B2 deriving unit 22. In Exemplary Embodiment 1, deriving second border information (B2($f_k$)) indicates deriving propagation distance $d_2$ at which reception power of a wireless signal (an example of a second wireless signal) from a position (for example, a transmission point position where SU transmitter 31 is disposed) of SU system 3 in third border B3 is reduced to a reception sensitivity of PU system 1. As methods of B2 deriving unit 22 deriving propagation distance $d_2$, the following four methods may be considered. In a description of the following computation example, as parameters used in common, bandwidth B used in a wireless service of PU system 1 is 60 MHz, carrier frequency $f_k$ is 26000 MHz, a reception carrier to noise ratio (CNR) at propagation distance $d_2$ is 0 dB, and a noise figure Nf is 6 dB.

First computation method: method of applying radio wave propagation loss formula in ideal radio wave propagation environment In the first computation method, an ideal radio wave propagation environment is supposed, and thus B2 deriving unit 22 does not use a measurement result of reception power in a radio wave sensor. Transmission power P of a wireless signal (second wireless signal) from SU system 3 is assumed to be 30 dBm.

As the radio wave propagation loss formula, propagation loss L is expressed by Equation (1). In Equation (1), $\alpha$ which indicates a radio wave propagation attenuation coefficient is about 2.0 in a line of sight (LOS) environment (that is, a prediction environment), and is about 3.0 to 4.0 in a non-line of sight (NLOS) environment. f indicates a carrier frequency [MHz]. A indicates an additional loss [dB]. In order not to underestimate propagation distance $d_2$, $\alpha=2.0$ and A=0 may be assumed.

$$L = 10\alpha \log_{10} d_2 + 20 \log_{10} f - 28 + A \quad (1)$$

As expressed in Equation (2), a difference between transmission power P and propagation loss L may be evaluated to be a reception CNR and a noise level of a reception signal at a position of SU receiver 33.

$$P - L = \text{CNR} + kTBN_f \quad (2)$$

Therefore, B2 deriving unit 22 may calculate propagation distance $d_2 \cong 1000$ m by assigning carrier frequency $f_k=26000$ MHz, radio wave propagation attenuation coefficient $\alpha=2.0$, additional loss A=0 dB, bandwidth B=60 MHz, the reception CNR=0 dB, kT=−174 dBm/Hz, and noise figure Nf=6 dB to Equations (1) and (2). In other words, in a case where propagation distance $d_2$ is not underestimated by using radio wave propagation attenuation coefficient $\alpha=2.0$ and additional loss A=0 dB, propagation distance $d_2$ has such a great value.

Second computation method: method of applying actually measured value of reception power in radio wave sensor to radio wave propagation loss formula in actual environment In the second computation method, B2 deriving unit 22 uses an actually measured value (measurement result) of reception power in a radio wave sensor in an actual environment. Reception power at a position (for example, an installation position of radio wave sensor 344 in FIG. 1) on third border B3 corresponding to a position of propagation distance $d_1$ from a transmission point position of SU transmitter 31 is indicated by $R_1$, and reception power at a position (for example, reception point position Ci in FIG. 1) on second border B2 corresponding to a position of propagation distance $d_2$ from the transmission point position of SU transmitter 31 is indicated by $R_2$.

In this case, when Equation (1) and (2) are applied to each of reception power $R_1$ and $R_2$, the following Equation (3) and Equation (4) are established. In Equation (4), reception power $R_2$ is assumed to be a noise level. B2 deriving unit 22 assumes both of additional loss $A_1$ in Equation (3) and additional loss $A_2$ in Equation (4) to be an identical constant value (that is, A is not 0 unlike the first computation method), and can thus estimate propagation distance $d_2$ suitable for a more actual real environment than in the first computation method.

$$L_1 = 10\alpha_1 \log_{10} d_1 + 20 \log_{10} f - 28 + A_1 = P - R_1 \quad (3)$$

$$L_2 = 10\alpha_2 \log_{10} d_2 + 20 \log_{10} f - 28 + A_2 = P - R_2 = P - kTBN_f \quad (4)$$

In other words, in Equations (3) and (4), additional loss $A_1$ is assumed to be the same as additional loss $A_2$, and thus the following Equation (5) is obtained. In Equation (5), in order not to underestimate propagation distance $d_2$, radio wave propagation attenuation coefficients $\alpha_1$ and $\alpha_2$ are assumed to be $\alpha_2=2.0$ and $\alpha_1>2.0$ (for example, $\alpha_1=3.0$).

$$\begin{aligned}10_{\alpha_2}\log_{10}d_2 &= P - kTBN_f - 20\log_{10}f + 28 - A_2 \\ &= P - kTBN_f - 20\log_{10}f + 28 - A_2 \\ &= P - kTBN_f - 20\log_{10}f + 28 - \\ &\quad (P - R_1 - 10_{\alpha_1}\log_{10}d_1 - 20\log_{10}f + 28) \\ &= R_1 - kTBN_f + 10_{\alpha_1}\log_{10}d_1\end{aligned} \quad (5)$$

Therefore, as a computation example, in a case where reception power $R_1$ measured by the radio wave sensor at propagation distance $d_1=10$ m is −70 dBm, B2 deriving unit 22 may calculate propagation distance $d_2 \cong 324$ m by assigning reception power $R_1$ to Equation (5).

Third and fourth computation methods: method of applying radio wave propagation attenuation coefficients $\alpha_1$ and $\alpha_2$ having values that are different from supposed values in second computation method In the third and fourth computation methods, B2 deriving unit 22 uses supposed values suitable for a more realistic environment than supposed values of radio wave propagation attenuation coefficients $\alpha_1$ and $\alpha_2$ in the second computation method. For example, propagation loss $L_1$ is a propagation loss of a radio wave at a restricted area (in other words, a relatively short distance) of SU system 3, and thus radio wave propagation attenuation coefficient $\alpha_1$ corresponding to propagation loss $L_1$ may have a value (in other words, close to a predicted propagation path) smaller than 3.0. On the other hand, propagation loss $L_2$ is a propagation loss of a radio wave at areas (in other words, a relatively long distance) other than a restricted area of SU system 3, and thus radio wave propagation attenuation coefficient $\alpha_2$ corresponding to propagation loss $L_2$ may have a value greater than 2.0.

Therefore, in the third computation method, assuming that $\alpha_1$ is 3.0, and $\alpha_2$ is 3.0, B2 deriving unit 22 may calculate propagation distance $d_2 \cong 47$ m by assigning reception power $R_1$ of −70 dBm measured by the radio wave sensor at propagation distance $d_1=10$ m to Equation (5) (refer to the second computation method).

Similarly, in the fourth computation method, assuming that $\alpha_1$ is 2.0, and $\alpha_2$ is 3.0, B2 deriving unit 22 may calculate propagation distance $d_2 \cong 22$ m by assigning reception power $R_1$ of −70 dBm measured by the radio wave sensor at propagation distance $d_1=10$ m to Equation (5) (refer to the second computation method).

As mentioned above, in calculating propagation distance $d_2$, B2 deriving unit 22 may use measured values of propagation distance $d_1$ and reception power $R_1$, and may use assumed values of radio wave propagation attenuation coefficients $\alpha_1$ and $\alpha_2$, to be assigned to Equation (5). Hereinafter, Table 1 shows a relationship among propagation distance $d_1$ [m], reception power $R_1$ [dBm], radio wave propagation attenuation coefficients $\alpha_1$ and $\alpha_2$, propagation distance $d_2$ [m], and power (P−$A_1$) [dBm]. As shown in Table 1, it can be seen that a value of propagation distance $d_2$ greatly depends on a combination of assumed values of radio wave propagation attenuation coefficients $\alpha_1$ and $\alpha_2$. Power (P−$A_1$) can be derived from Equation (3), and is an image of a value obtained by subtracting a loss in a case where a shield is inserted into a propagation path from transmission power.

In other words, it is assumed that radio wave propagation attenuation coefficient $\alpha_1$ at propagation distance $d_1$ from a transmission point that is a disposition location of transmitter Tx of SU system 3 in which a radio wave propagates at a relatively short distance to an installation position of a radio wave sensor (for example, radio wave sensor 344) employs 2.0 corresponding to the LOS environment, and radio wave propagation attenuation coefficient $\alpha_2$ at propagation distance $d_2$ at which reception power of a radio wave is reduced to a noise level from a transmission point that is a disposition location of transmitter Tx of SU system 3 in which a radio wave propagates at a relatively long distance employs 3.0 corresponding to the NLOS environment.

In this case, propagation distance $d_2$ derived by B2 deriving unit 22 is calculated as the smallest value among values obtained according to the first computation method to the fourth computation method. This value may be the most realistic value at a glance, but it may not be proper that an establisher of SU system 3 employs the smallest value as propagation distance $d_2$ depending on a supposed use environment of a wireless service. Thus, the establisher of SU system 3 preferably measures which value of propagation distance $d_2$ obtained through computation is most appropriate for an actual environment on the basis of actual measurement or simulation at least before a wireless service is started. When B2 deriving unit 22 calculates propagation distance $d_2$ so as to derive second border B2, it is more appropriate to determine radio wave propagation attenuation coefficients $\alpha_1$ and $\alpha_2$ by measuring reception power by using each of one or more radio wave sensors 341 to 344 with a propagation distance from a transmission point that is a disposition position of transmitter Tx as a parameter in the vicinity of a restricted area of SU system 3, and obtaining radio wave propagation attenuation coefficients $\alpha_1$ and $\alpha_2$ through measurement.

TABLE 1

| $d_1$[m] | $R_1$[dBm] | $\alpha_1$ | $\alpha_2$ | $d_2$[m] | P-$A_1$[dBm] |
|---|---|---|---|---|---|
| 10 | −70 | 3.0 | 2.0 | 324 | 20.3 |
| 10 | −70 | 3.0 | 3.0 | 47 | 20.3 |
| 10 | −70 | 2.0 | 3.0 | 22 | 10.3 |
| 10 | −60 | 3.0 | 2.0 | 1023 | 30.3 |
| 10 | −60 | 3.0 | 3.0 | 102 | 30.3 |
| 10 | −60 | 2.0 | 3.0 | 47 | 20.3 |
| 10 | −80 | 3.0 | 2.0 | 102 | 10.3 |
| 10 | −80 | 3.0 | 3.0 | 22 | 10.3 |
| 10 | −80 | 2.0 | 3.0 | 10 | 0.3 |
| 50 | −70 | 3.0 | 2.0 | 3631 | 41.3 |
| 50 | −70 | 3.0 | 3.0 | 236 | 41.3 |
| 50 | −70 | 2.0 | 3.0 | 64 | 24.3 |
| 100 | −70 | 3.0 | 2.0 | 10233 | 50.3 |
| 100 | −70 | 3.0 | 3.0 | 471 | 50.3 |
| 100 | −70 | 2.0 | 3.0 | 101 | 30.3 |

Actually, measuring reception power $R_1$ (measured value) at an installation location (that is, propagation distance $d_1$ from a transmission point that is a disposition location of transmitter Tx) of a radio wave sensor is not difficult work even though periodically performed (for example, once an hour), but measuring propagation distance $d_2$ (in other words, a distance at which attenuation to reception power having no influence on PU system 1 occurs from the transmission point that is a disposition location of transmitter Tx) required to embody the presence of second border B2 is difficult work. Periodically measuring propagation distance $d_2$ is more difficult work, and thus Exemplary Embodiment 1 has a characteristic technical element in that propagation distance $d_2$ is calculated by using the computation formulae instead of measurement using a radio wave sensor.

However, in the computation formulae for deriving propagation distance $d_2$, assuming radio wave propagation attenuation coefficients $\alpha_1$ and $\alpha_2$ (for example, $\alpha_1$=2.0 and $\alpha_2$=3.0) having the great influence on calculation of propagation distance $d_2$ as appropriate has the following risks. Specifically, there is a risk of underestimating propagation distance $d_2$ (that is, a case where radio wave propagation attenuation coefficient $\alpha_1$ is assumed to be a value smaller than a value suitable for an actual environment, and radio wave propagation attenuation coefficient $\alpha_2$ is assumed to be a value greater than a value suitable for an actual environment), or a risk of uselessly overestimating propagation distance $d_2$ (a case where radio wave propagation attenuation coefficient $\alpha_1$ is assumed to be a value greater than a value suitable for an actual environment, and radio wave propagation attenuation coefficient $\alpha_2$ is assumed to be a value smaller than a value suitable for an actual environment). Therefore, as described above, it is proper that the establisher of SU system 3 performs work, at least once, of measuring reception power by changing a propagation distance from a transmission point that is a disposition location of transmitter Tx in the restricted area (in other words, the area surrounded by third border B3) of SU system 3 as a parameter, and obtaining values of radio wave propagation attenuation coefficients $\alpha_1$ and $\alpha_2$ through actual measurement on the basis of a measurement result.

Therefore, since avoiding the risk of underestimating propagation distance $d_2$ is to be emphasized more than avoiding the risk of uselessly overestimating propagation distance $d_2$, radio wave propagation attenuation coefficient $\alpha_1$ is to be determined to be a value slightly greater than a value obtained through measurement, and radio wave propagation attenuation coefficient $\alpha_2$ is to be determined to be a value slightly smaller than a value obtained through measurement. For example, in a case where $\alpha_1$ is 2.08 and $\alpha_2$ is 3.23 through measurement, when $\alpha_1$=2.2 and $\alpha_2$=3.0 are used in Equation (5) instead of assigning the original values to Equation (5), propagation distance $d_2$ is calculated to be a value greater than an actual value. In other words, consequently, the prerequisite that interference from SU system 3 does not have an ill effect on PU system 1 can be more reliably observed.

On the other hand, in a case where first border B1 of PU system 1 is clearly separated from second border B2 of SU system 3 (for example, intersection area S illustrated in FIG. 1 does not occur), propagation distance $d_2$ may be calculated by employing $\alpha_1$=3.0 and $\alpha_2$=2.0 in awareness of the risk of uselessly overestimating propagation distance $d_2$. In this case, measurement work for deriving radio wave propagation attenuation coefficient $\alpha$ is not necessary.

Figure 3:
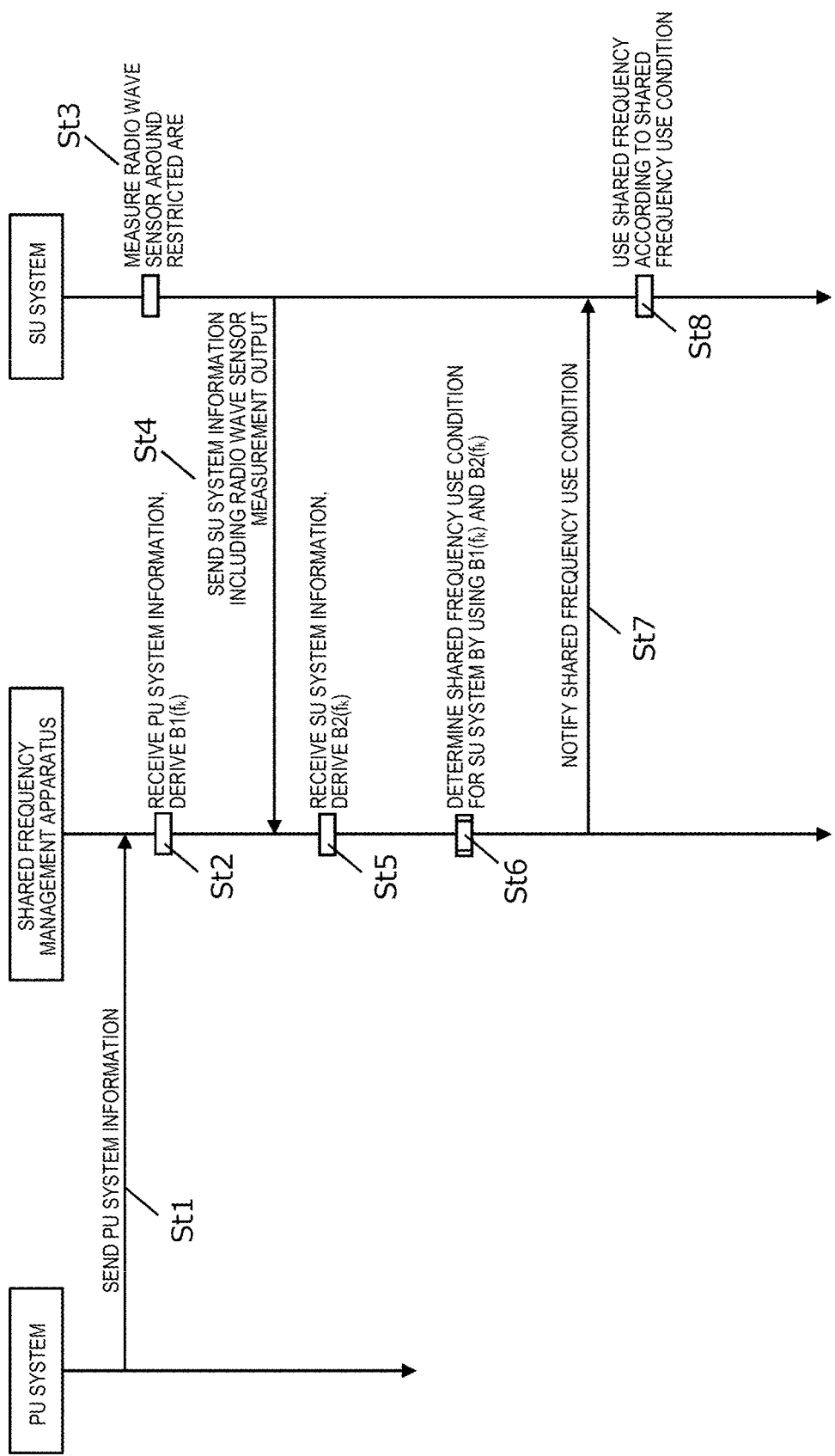
FIG. 3 is a sequence diagram illustrating a time series of operation procedures of the shared frequency management system according to Exemplary Embodiment 1.
Figure 4:
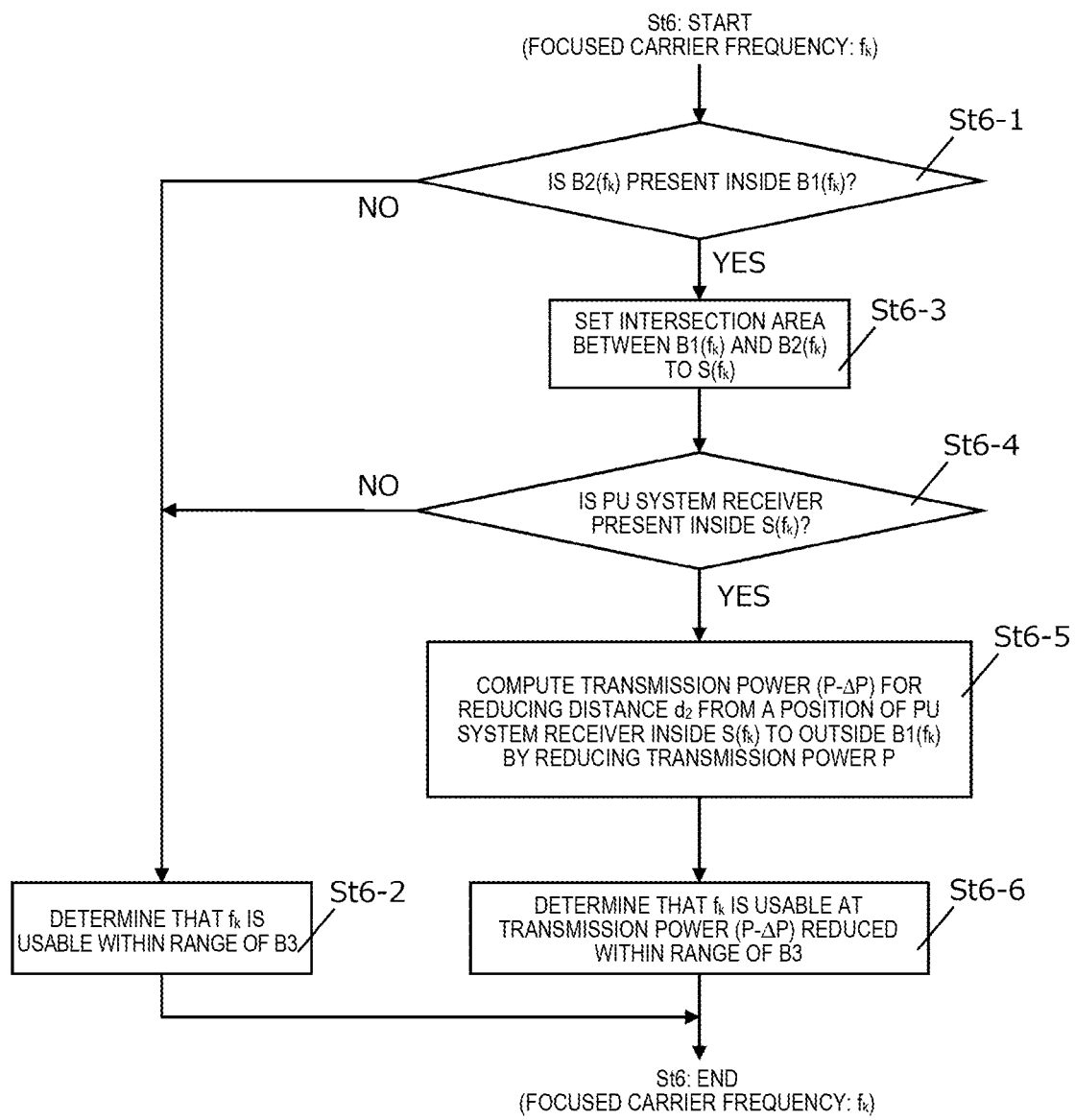
FIG. 4 is a flowchart illustrating a time series of detailed operation procedures in step St6 in FIGS. 3 and 6.

Next, with reference to FIGS. 3 and 4, a description will be made of operation procedures of the shared frequency management system according to Exemplary Embodiment 1. FIG. 3 is a sequence diagram illustrating a time series of operation procedures of the shared frequency management system according to Exemplary Embodiment 1. FIG. 4 is a flowchart illustrating a time series of detailed operation procedures in step St6 in FIG. 3.

In FIG. 3, PU system 1 sends PU system information (for example, information regarding transmission such as a transmitter position indicating an installation position of PU transmitter 11, a carrier frequency (center frequency), a bandwidth, and transmission power, and information regarding reception such as a receiver position indicating an installation position of PU receiver 13 and a reception sensitivity) to shared frequency management apparatus 2 (St1).

Shared frequency management apparatus 2 receives the PU system information sent in step St1, and reads geographic information from topography/building geographic data holding unit 25. Shared frequency management apparatus 2 causes B1 deriving unit 21 to derive $B1(f_k)$ as an example of first border information regarding the first border corresponding to carrier frequency $f_k$ by using the geographic information and the PU system information (St2).

SU system 3 measures reception power of a wireless signal in each of one or more radio wave sensors 341 to 344 disposed around a restricted area in response to transmission of the wireless signal based on transmission power from SU transmitter 31 of SU system 3 (St3). SU system 3 sends SU system information (for example, a carrier frequency, a bandwidth, transmission power, and third border information indicating a border line of the restricted area of SU system 3) including a measurement result of the reception power in step St3, to shared frequency management apparatus 2 (St4).

Shared frequency management apparatus 2 receives the SU system information sent in step St4, and causes B2 deriving unit 22 to derive $B2(f_k)$ as an example of second border information corresponding to carrier frequency $f_k$ through computation (refer to any one of the first computation method to the fourth computation method) by using the SU system information (St5). Shared frequency management apparatus 2 determines a shared frequency use condition regarding a frequency of a shared frequency band for SU system 3 by using first border information ($B1(f_k)$) and second border information ($B2(f_k)$) from B2 deriving unit 22 (St6). Shared frequency management apparatus 2 notifies SU system 3 of the shared frequency use condition determined in step St6 (St7).

SU system 3 can use a shared frequency in a wireless service of SU system 3 according to the shared frequency use condition of which a notification is sent from shared frequency management apparatus 2 in step St7 (St8).

Next, with reference to FIG. 4, a description will be made of details of an operation of shared frequency management apparatus 2 regarding determination of the shared frequency use condition in step St6. The process illustrated in FIG. 4 is performed by, for example, permission target frequency sharing condition determination unit 23 of shared frequency management apparatus 2, and is a process of determining a shared frequency use condition corresponding to focused carrier frequency $f_k$ in a shared frequency band, and a process of determining a shared frequency use condition corresponding to another carrier frequency in the identical shared frequency band is repeatedly performed in the same manner. In other words, shared frequency management apparatus 2 repeatedly performs the process of determining a shared frequency use condition illustrated in FIG. 4 so as to sequentially sweep carrier frequencies of a shared frequency band.

In FIG. 4, shared frequency management apparatus 2 determines whether or not second border $B2(f_k)$ is present inside first border $B1(f_k)$ (that is, a communication area in which a wireless service of PU system 1 is received) by using the PU system information and the SU system information (St6-1). In a case where it is determined that second border $B2(f_k)$ is not present inside first border $B1(f_k)$ (NO in St6-1), shared frequency management apparatus 2 determines that currently focused carrier frequency $f_k$ is usable within a range of third border B3 (St6-2). This is because, since second border $B2(f_k)$ is not present inside first border $B1(f_k)$, even though SU system 3 provides a wireless service using currently focused carrier frequency $f_k$, it is hard to give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

On the other hand, in a case where it is determined that second border $B2(f_k)$ is present inside first border $B1(f_k)$ (YES in St6-1), shared frequency management apparatus 2 sets an intersection area (overlapping area) with second border $B2(f_k)$ present inside first border $B1(f_k)$ to $S(f_k)$ (St6-3).

Shared frequency management apparatus 2 determines whether or not PU receiver 13 of PU system 1 is present inside intersection area $S(f_k)$ by using the PU system information and the SU system information (St6-4). In a case where it is determined that PU receiver 13 of PU system 1 is not present inside intersection area $S(f_k)$ (NO in St6-4), shared frequency management apparatus 2 similarly determines that currently focused carrier frequency $f_k$ is usable within a range of third border B3 (St6-2). This is because, since PU receiver 13 receiving a wireless signal from PU transmitter 11 of PU system 1 during an operation of PU system 1 is not present inside intersection area $S(f_k)$ in the first place, even though SU system 3 provides a wireless service using currently focused carrier frequency $f_k$, it is hard to give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

On the other hand, in a case where it is determined that PU receiver 13 of PU system 1 is present inside intersection area $S(f_k)$ (YES in St6-4), shared frequency management apparatus 2 computes transmission power ($P-\Delta P$) required to reduce propagation distance $d_2$ to a position of PU receiver 13 of PU system 1 inside intersection area S(fk) to any position outside first border $B1(f_k)$ by referring to Equations (3) and (4) (St6-5). Shared frequency management apparatus 2 determines that currently focused carrier frequency $f_k$ is usable assuming that transmission power ($P-\Delta P$) after the reduction, computed in step St6-5 is used within the range of third border B3 (St6-6). This is because, since PU receiver 13 receiving a wireless signal from PU transmitter 11 of PU system 1 during an operation of PU system 1 is present inside intersection area $S(f_k)$ in the first place, when SU system 3 provides a wireless service using currently focused carrier frequency $f_k$, transmission power from SU transmitter 31 of SU system 3 is to be reduced such that a radio wave from SU system 3 does not give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

As mentioned above, in the shared frequency management system according to Exemplary Embodiment 1, shared frequency management apparatus 2 manages sharing of a frequency of a shared frequency band that is mainly used by PU system 1, with SU system 3. Shared frequency management apparatus 2 derives the first border information regarding first border B1 indicating a border of a first region in which a reception level based on transmission of a wireless signal using a frequency of a shared frequency band from PU system 1 becomes a defined value (for example, a reception sensitivity). Shared frequency management apparatus 2 derives the second border information regarding second border B2 indicating a border of a second region in which a reception level based on transmission of a wireless signal using a frequency of a shared frequency band from SU system 3 becomes a defined value (for example, a reception sensitivity). Shared frequency management apparatus 2 determines a shared frequency use condition regarding a frequency of a shared frequency band for SU system 3 on the basis of the first border information and the second border information.

Consequently, shared frequency management apparatus 2 can easily manage permission of SU system 3's use of at least some shared frequencies preferentially usable by PU system 1 without performing complicated interference computation described in the first approach in the related art. Shared frequency management apparatus 2 can simplify procedures of sharing a frequency of a shared frequency band between PU system 1 and SU system 3 without building a reception power map that is considerably difficult to build as described in the second approach in the related art, and can thus improve a possibility of realizing frequency sharing. Shared frequency management apparatus 2 can suppress SU system 3 from giving interference of a reception sensitivity or more of PU system 1 due to a radio wave to PU system 1, and can thus suppress a reduction of use efficiency of a frequency of a shared frequency band between PU system 1 and SU system 3 by freely permitting some frequencies of the shared frequency band used by PU system 1 to be used by SU system 3.

Shared frequency management apparatus 2 determines a shared frequency use condition for each frequency of a shared frequency band. Consequently, shared frequency management apparatus 2 can determine whether or not a use permission is given to SU system 3 for each of a plurality of carrier frequencies of a shared frequency band (for example, the 20 GHz to 30 GHz band), and can thus relatively easily guarantee the presence of a carrier frequency that can be permitted to be used by SU system 3.

Shared frequency management apparatus 2 derives the second border information by using information regarding a communication method of SU system 3, including reception power of a wireless signal from SU system 3 measured by each of radio wave sensors 341 to 344 provided around a local area (for example, a restricted area) in which SU system 3 is used. Consequently, shared frequency management apparatus 2 uses an actually measured value of reception power of which a radio wave radiated from SU system 3 is measured around a border of the restricted area of SU system 3, and can thus derive a propagation distance of a radio wave that does not give interference to PU system 1 and is suitable for an actual operation environment of SU system 3.

In a case where it is determined that an overlapping region between first border B1 and second border B2 is not present on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used. Consequently, shared frequency management apparatus 2 may determine that a possibility of a radio wave radiated from SU system 3 having an ill effect such as interference on PU receiver 13 present in a communication area of PU system 1 is low. Therefore, even though the shared frequency management apparatus 2 permits SU system 3 to use the focused carrier frequency, PU system 1 is not hindered from using a shared frequency, and thus it is possible to effectively promote frequency sharing for SU system 3.

In a case where it is determined that an overlapping region between first border B1 and second border B2 is present, and PU receiver 13 corresponding to PU system 1 is not disposed in the overlapping region, on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used. Consequently, even though intersection area $S(f_k)$ is present, PU receiver 13 is not present in the intersection area, and thus shared frequency management apparatus 2 may determine that a possibility of a radio wave radiated from SU system 3 having an ill effect such as interference on PU receiver 13 present in a communication area of PU system 1 is substantially low. Therefore, even though shared frequency management apparatus 2 permits SU system 3 to use the focused carrier frequency, PU system 1 is not substantially hindered from using a shared frequency, and thus it is possible to effectively promote frequency sharing for SU system 3.

In a case where it is determined that an overlapping region between first border B1 and second border B2 is present, and PU receiver 13 corresponding to PU system 1 is disposed in the overlapping region, on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used assuming that transmission power of a wireless signal from SU system 3 in the local area is reduced by a predetermined amount. Consequently, shared frequency management apparatus 2 can reduce a radio wave radiated from SU system 3 to transmission power with which the radio wave propagates to only the outside of first border B1, and can thus reduce a possibility of the radio wave radiated from SU system 3 having an ill effect such as interference on PU receiver 13 present in a communication area of PU system 1. Therefore, even though shared frequency management apparatus 2 permits SU system 3 to use the focused carrier frequency on the condition that transmission power with which a radio wave propagates to only the outside of first border B1 is used, PU system 1 is not substantially hindered from using a shared frequency, and thus it is possible to effectively promote frequency sharing for SU system 3.

Shared frequency management apparatus 2 further includes topography/building geographic data holding unit 25 holding geographic information indicating topography and the presence or absence of a building of an area in which a wireless signal from PU system 1 is received. Shared frequency management apparatus 2 derives the first border information by using information regarding a communication method of PU system 1 and the geographic information read from topography/building geographic data holding unit 25. Consequently, shared frequency management apparatus 2 can adaptively derive first border B1 where reception power becomes a reception sensitivity in accordance with an actual environment by taking into consideration geographic information regarding topography or a building present in a propagation path through which a radio wave radiated from PU system 1 propagates.

Shared frequency management apparatus 2 notifies SU system 3 of a shared frequency use condition. Consequently, SU system 3 can use a shared frequency (carrier frequency) defined in the shared frequency use condition to the extent of not giving interference in which reception power becomes a reception sensitivity or more to PU system 1 on the basis of the shared frequency use condition determined by shared frequency management apparatus 2.

Exemplary Embodiment 2

In Exemplary Embodiment 1, third-party shared frequency management apparatus 2 determines whether or not a shared frequency requested by SU system 3 is usable between PU system 1 and SU system 3. In Exemplary Embodiment 2, a configuration of third-party shared frequency management apparatus 2 is omitted, and a description will be made of examples of a shared frequency management system and a shared frequency management method in which PU system 1 and SU system 3 perform direct exchange.

In a configuration of a shared frequency management system according to Exemplary Embodiment 2, the same configuration as the configuration of the shared frequency management system according to Exemplary Embodiment 1 will be given the same reference numeral, and a description thereof will be made briefly or will be omitted, and different contents will be described.

Figure 5:
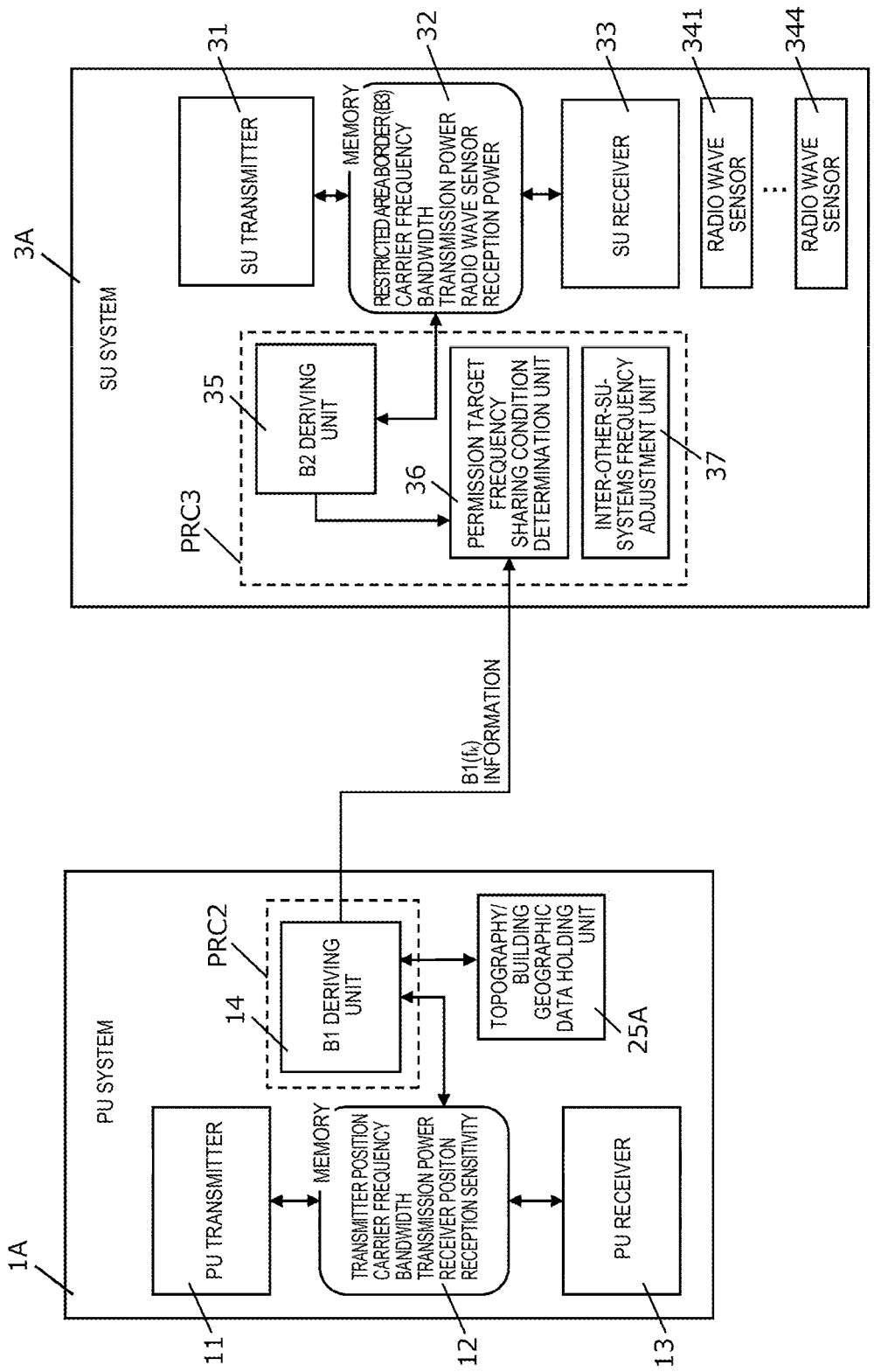
FIG. 5 is a block diagram illustrating an internal configuration example of a shared frequency management system according to Exemplary Embodiment 2.

FIG. 5 is a block diagram illustrating an internal configuration example of a shared frequency management system according to Exemplary Embodiment 2. The shared frequency management system according to Exemplary Embodiment 2 is configured to include PU system 1A, SU system 3A, and one or more radio wave sensors 341 to 344 (refer to FIG. 1). PU system 1A and SU system 3A can perform transmission and reception of data or information therebetween. For better understanding of description, FIG. 5 illustrates only a single SU system 3A, but a plurality of SU systems may be provided.

PU system 1A as an example of a first wireless system is a wireless system controlled to be operated by a system operator (a so-called primary user) to whom frequencies (for example, the 20 GHz to the 30 GHz band) of a predetermined shared frequency band are allocated to be mainly or substantially exclusively usable. PU system 1A includes one or more PU transmitters 11, memories 12, PU receivers 13, B1 deriving units 14, and topography/building geographic data holding units 25A required to operate PU system 1A. B1 deriving unit 14 is configured by using processor PRC2 such as a CPU, a DSP, or an FPGA, and is functionally configured by processor PRC2 reading and executing a program stored in memory 12. Processor PRC2 functions as a controller controlling an operation of PU system 1A, and performs a control process for totally controlling operations of the respective units of PU system 1A, data input and output processes among the respective units of PU system 1A, a data calculation (computation) process, and a data storage process. Processor PRC2 operates according to a program stored in memory 12. Processor PRC2 uses memory 12 during an operation, and stores data generated by processor PRC2 into memory 12.

B1 deriving unit 14 as a second deriving unit reads geographic information from topography/building geographic data holding unit 25A, and derives B1($f_k$) as an example of first border information regarding a first border corresponding to carrier frequency $f_k$ by using the geographic information and PU system information stored in memory 12. In other words, B1 deriving unit 14 can derive position information of a region (an example of a first region) surrounded by first border B1. B1 deriving unit 14 transmits the derived first border information to SU system 3A.

Topography/building geographic data holding unit 25A as an example of a geographic data holding unit is configured by using a hard disk drive (HDD) or a solid state drive (SSD), and stores geographic information including topographic information and building information in areas where PU system 1A and SU system 3A are installed.

SU system 3A as an example of a second wireless system is a wireless system that determines whether or not SU system 3A conditionally uses some frequencies (for example, the 20 GHz to the 30 GHz band) of the predetermined shared frequency band that is mainly or substantially exclusively usable by PU system 1A. SU system 3A includes one or more SU transmitters 31, memories 32, SU receivers 33, B2 deriving units 35, permission target frequency sharing condition determination units 36, and inter-other-SU-systems frequency adjustment units 37 required to operate SU system 3A. B2 deriving unit 35, permission target frequency sharing condition determination unit 36, and inter-other-SU-systems frequency adjustment unit 37 are configured by using processor PRC3 such as a CPU, a DSP, or an FPGA, and are functionally configured by processor PRC3 reading and executing a program stored in memory 32. Processor PRC3 functions as a controller controlling an operation of SU system 3A, and performs a control process for totally controlling operations of the respective units of SU system 3A, data input and output processes among the respective units of SU system 3A, a data calculation (computation) process, and a data storage process. Processor PRC3 operates according to a program stored in memory 32. Processor PRC3 uses memory 32 during an operation, and stores data generated by processor PRC3 into memory 32.

B2 deriving unit 35 as an example of a deriving unit derives B2($f_k$) as an example of second border information regarding a second border corresponding to carrier frequency $f_k$ through computation (refer to Exemplary Embodiment 1) by using SU system information. In other words, B2 deriving unit 35 can derive position information of a region (an example of a second region) surrounded by second border B2. B2 deriving unit 35 outputs the derived second border information to permission target frequency sharing condition determination unit 36.

Permission target frequency sharing condition determination unit 36 as an example of an input unit receives first border information (B1($f_k$)) from PU system 1A and second border information (B2($f_k$)) from B2 deriving unit 35. Permission target frequency sharing condition determination unit 36 determines a shared frequency use condition (an example of a sharing permission condition) regarding a frequency of a shared frequency band for SU system 3A by using first border information (B1($f_k$)) and second border information (B2($f_k$)) from B2 deriving unit 35. In other words, permission target frequency sharing condition determination unit 36 as an example of a permission condition determination unit determines whether or not SU system 3A is permitted to use carrier frequency $f_k$ in SU system 3A.

Inter-other-SU-systems frequency adjustment unit 37 performs a segregation process for suppressing the occurrence of interference between other SU systems (not illustrated in FIG. 5) in using a shared frequency defined in the shared frequency use condition of which a notification is sent from permission target frequency sharing condition determination unit 36. Inter-other-SU-systems frequency adjustment unit 37 tries to use a shared frequency in an autonomously distributed manner according to a priority order of a shared frequency (carrier frequency) group in the respective SU systems, for example, on the basis of shared frequency use histories (preserved in memory 32) among the SU systems. Inter-other-SU-systems frequency adjustment unit 37 uses the shared frequency in a case where a determination result of the use being permitted is obtained as a result of trying to use the shared frequency, and does not use the shared frequency in a case where a determination result of the use not being permitted is obtained. Each SU system increases a probability of reusing a carrier frequency that is highly frequently used with respect to a plurality of present carrier frequencies as shared frequencies permitted to be used, and can thus segregate an actually used carrier frequency among the SU systems in an autonomously distributed manner. According to this method, without the presence of a functional device that collectively manages a plurality of SU systems, each SU system can use a shared frequency not causing an interference problem with other SU systems among the SU systems in an autonomously distributed manner. In a stage in which a shared frequency is permitted to be used, a shared frequency can be prevented to be divided among SU systems, and thus it is also possible to prevent a reduction of shared frequency use efficiency due to a division loss. In order for use frequency segregation in the autonomous distribution to be efficiently operated, as many carrier frequencies as possible are preferably present as the use unit of a shared frequency in an SU system, and thus a wireless bandwidth of a single carrier frequency is preferably small as appropriate. For example, in a case where an SU system is a 5G system, it is effective to increase the number of carrier frequencies by setting a wireless bandwidth to a value of 100 MHz or less (for example, 20 MHz or 40 MHz) instead of a broadband such as 400 MHz even in a case of the 5G system.

Figure 6:
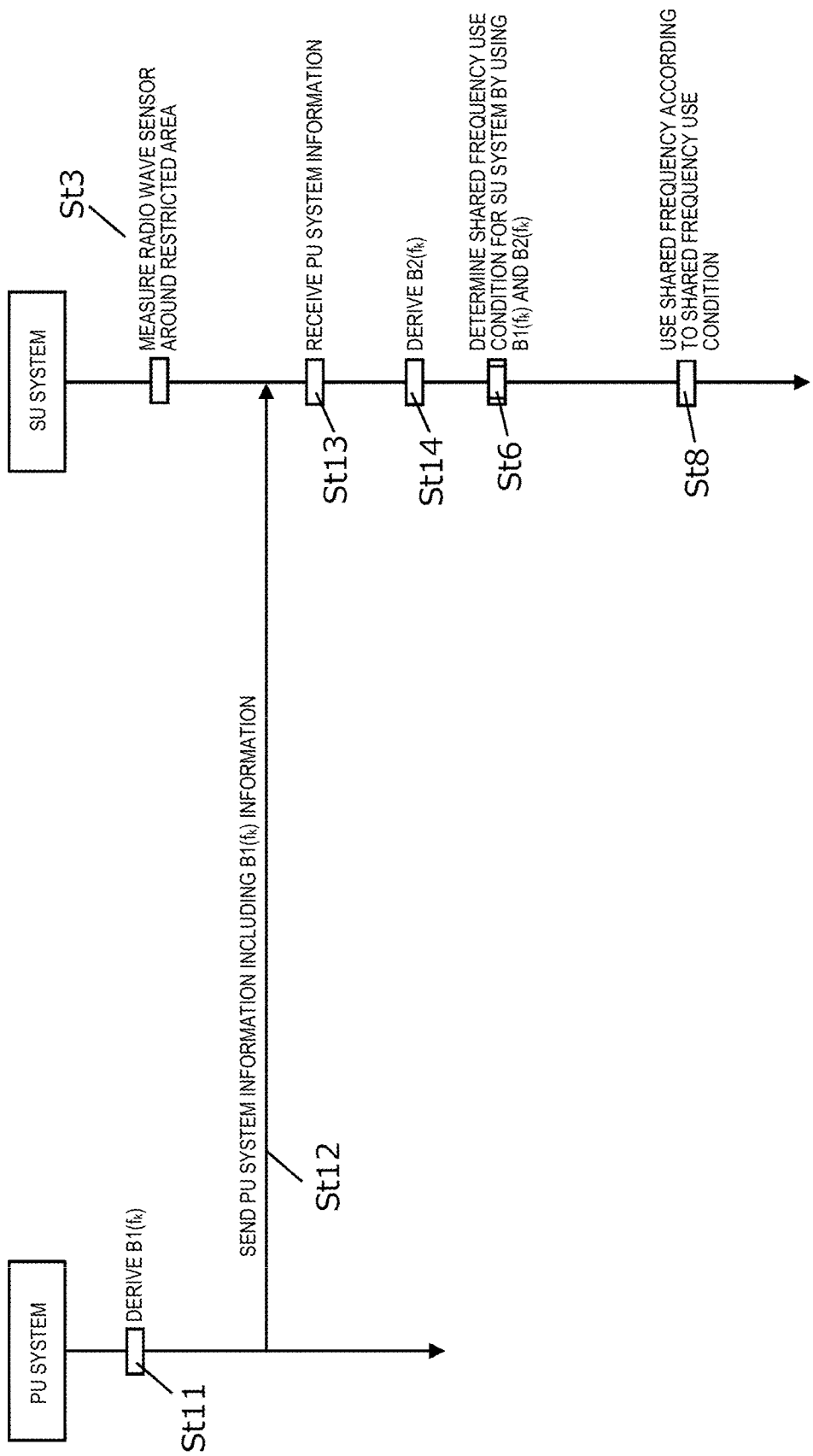
FIG. 6 is a sequence diagram illustrating a time series of operation procedures of the shared frequency management system according to Exemplary Embodiment 2.

Next, with reference to FIG. 6, a description will be made of operation procedures of the shared frequency management system according to Exemplary Embodiment 2. FIG. 6 is a sequence diagram illustrating a time series of operation procedures of the shared frequency management system according to Exemplary Embodiment 2. In a description of FIG. 6, the same process as the process in FIG. 3 will be given the same reference sign, a description thereof will be made briefly or will be omitted, and different contents will be described. A content of the process in step St6 in FIG. 6 is the same as the content in FIG. 4 described in Exemplary Embodiment 1, and thus a description of the content in FIG. 4 will be omitted here.

In FIG. 6, PU system 1A acquires PU system information (for example, information regarding transmission such as a transmitter position indicating an installation position of PU transmitter 11, a carrier frequency (center frequency), a bandwidth, and transmission power, and information regarding reception such as a receiver position indicating an installation position of PU receiver 13 and a reception sensitivity). PU system 1A reads geographic information from topography/building geographic data holding unit 25A. PU system 1A causes B1 deriving unit 14 to derive $B1(f_k)$ as an example of first border information regarding the first border corresponding to carrier frequency $f_k$ by using the geographic information and the PU system information (St11). PU system 1A transmits $B1(f_k)$ as an example of the first border information derived in step St11 to SU system 3A (St12).

On the other hand, SU system 3A measures reception power of a wireless signal in each of one or more radio wave sensors 341 to 344 disposed around a restricted area in response to transmission of the wireless signal based on transmission power from SU transmitter 31 of SU system 3A (St3). SU system 3A receives and acquires $B1(f_k)$ as an example of the first border information sent from PU system 1A in step St12 (St13). SU system 3A acquires SU system information (for example, a carrier frequency, a bandwidth, transmission power, and third border information indicating a border line of the restricted area of SU system 3) including a measurement result of the reception power in step St3. SU system 3A causes B2 deriving unit 35 to derive $B2(f_k)$ as an example of second border information corresponding to carrier frequency $f_k$ through computation (refer to any one of the first computation method to the fourth computation method) by using the acquired SU system information (St14).

SU system 3A causes permission target frequency sharing condition determination unit 36 to determine a shared frequency use condition regarding a frequency of a shared frequency band for SU system 3A by using first border information ($B1(f_k)$) and second border information ($B2(f_k)$) from B2 deriving unit 35 (St6). SU system 3A can use a shared frequency in a wireless service of SU system 3A according to the shared frequency use condition determined in step St6 (St8).

As mentioned above, in the shared frequency management system according to Exemplary Embodiment 2, SU system 3A manages sharing of a frequency of a shared frequency band mainly used by PU system 1A with SU systems 3A. SU system 3A receives, from PU system 1A, the first border information regarding first border B1 indicating a border of a first region in which a reception level based on transmission of a wireless signal using a frequency of a shared frequency band from PU system 1A becomes a defined value (for example, a reception sensitivity). SU system 3A derives the second border information regarding second border B2 indicating a border of a second region in which a reception level based on transmission of a wireless signal using a frequency of a shared frequency band from SU system 3A becomes a defined value (for example, a reception sensitivity). SU system 3A determines a shared frequency use condition regarding a frequency of a shared frequency band for SU system 3A on the basis of the first border information and the second border information.

Consequently, SU system 3A can easily manage permission of SU system 3A's use of at least some shared frequencies that are preferentially usable by PU system 1A without performing complicated interference computation described in the first approach in the related art. SU system 3A can simplify procedures of sharing a frequency of a shared frequency band between PU system 1A and SU system 3A without building a reception power map that is considerably difficult to build as described in the second approach in the related art, and can thus improve a possibility of realizing frequency sharing. SU system 3A can suppress SU system 3A from giving interference of a reception sensitivity or more of PU system 1A due to a radio wave to PU system 1A, and can thus suppress a reduction of use efficiency of a frequency of a shared frequency band between PU system 1A and SU system 3A by freely permitting some frequencies of the shared frequency band used by PU system 1A to be used by SU system 3A.

SU system 3A determines a shared frequency use condition for each frequency of a shared frequency band. Consequently, SU system 3A can determine whether or not a use permission is given to SU system 3A for each of a plurality of carrier frequencies of a shared frequency band (for example, the 20 GHz to 30 GHz band), and can thus relatively easily guarantee the presence of a carrier frequency that can be permitted to be used by SU system 3A.

SU system 3A derives the second border information by using information regarding a communication method of SU system 3A, including reception power of a wireless signal from SU system 3A measured by each of radio wave sensors 341 to 344 provided around a local area (for example, a restricted area) in which SU system 3A is used. Consequently, SU system 3A uses an actually measured value of reception power of which a radio wave radiated from SU system 3A is measured around a border of the restricted area of SU system 3A, and can thus derive a propagation distance of a radio wave that does not give interference to PU system 1A and is suitable for an actual operation environment of SU system 3A.

In a case where it is determined that an overlapping region between first border B1 and second border B2 is not present on the basis of the first border information and the second border information corresponding to any one specific frequency (for example, focused carrier frequency $f_k$) among frequencies of a shared frequency band, SU system 3A determines that the specific frequency is permitted to be used in a local area (for example, a restricted area) in which SU system 3A is used. Consequently, SU system 3A may determine that a possibility of a radio wave radiated from SU system 3A having an ill effect such as interference on PU receiver 13 present in a communication area of PU system 1A is low. Therefore, even though the SU system 3A permits SU system 3A to use the focused carrier frequency, PU system 1A is not hindered from using a shared frequency, and thus it is possible to effectively promote frequency sharing for SU system 3A.

In a case where it is determined that an overlapping region between first border B1 and second border B2 is present, and PU receiver 13 corresponding to PU system 1A is not disposed in the overlapping region, on the basis of the first border information and the second border information corresponding to any one specific frequency (for example, focused carrier frequency $f_k$) among frequencies of a shared frequency band, SU system 3A determines that the specific frequency is permitted to be used in a local area (for example, a restricted area) in which SU system 3A is used. Consequently, even though intersection area $S(f_k)$ is present, PU receiver 13 is not present in the intersection area, and thus SU system 3A may determine that a possibility of a radio wave radiated from SU system 3A having an ill effect such as interference on PU receiver 13 present in a communication area of PU system 1A is substantially low. Therefore, even though SU system 3A permits SU system 3A to use the focused carrier frequency, PU system 1A is not substantially hindered from using a shared frequency, and thus it is possible to effectively promote frequency sharing for SU system 3A.

In a case where it is determined that an overlapping region between first border B1 and second border B2 is present, and PU receiver 13 corresponding to PU system 1A is disposed in the overlapping region, on the basis of the first border information and the second border information corresponding to any one specific frequency (for example, focused carrier frequency $f_k$) among frequencies of a shared frequency band, SU system 3A determines that the specific frequency is permitted to be used in a local area (for example, a restricted area) in which SU system 3A is used assuming that transmission power of a wireless signal from SU system 3A in the local area is reduced by a predetermined amount. Consequently, SU system 3A can reduce a radio wave radiated from SU system 3A to transmission power with which the radio wave propagates to only the outside of first border B1, and can thus reduce a possibility of the radio wave radiated from SU system 3A having an ill effect such as interference on PU receiver 13 present in a communication area of PU system 1A. Therefore, even though SU system 3A permits SU system 3A to use the focused carrier frequency on the condition that transmission power with which a radio wave propagates to only the outside of first border B1 is used, PU system 1A is not substantially hindered from using a shared frequency, and thus it is possible to effectively promote frequency sharing for SU system 3A.

PU system 1A further includes topography/building geographic data holding unit 25A holding geographic information indicating topography and the presence or absence of a building of an area in which a wireless signal from PU system 1A is received. PU system 1A derives the first border information by using information regarding a communication method of PU system 1A and the geographic information read from topography/building geographic data holding unit 25A. Consequently, PU system 1A can adaptively derive first border B1 where reception power becomes a reception sensitivity in accordance with an actual environment by taking into consideration geographic information regarding topography or a building present in a propagation path through which a radio wave radiated from PU system 1A propagates.

SU system 3A notifies SU system 3A of a shared frequency use condition. Consequently, SU system 3A can use a shared frequency (carrier frequency) defined in the shared frequency use condition to the extent of not giving interference in which reception power becomes a reception sensitivity or more to PU system 1A on the basis of the shared frequency use condition determined by SU system 3A.

As mentioned above, in each of Exemplary Embodiments 1 and 2, α (radio wave propagation attenuation coefficient) in the radio wave propagation loss formula is assumed in deriving $B2(f_k)$ as an example of the second border information, and thus an approximately appropriate evaluation result can be derived without performing accurate simulation or actual measurement in which a building or topography is taken into consideration. However, an appropriate value as radio wave propagation attenuation coefficient α when each SU system (for example, an SU system in a restricted area) calculates propagation distance $d_2$ may be obtained on the basis of a result of $B2(f_k)$ using a value of more realistic α by performing measurement of a propagation distance to a radio wave propagation loss when the SU system is established. In $B1(f_k)$ and $B2(f_k)$, even though α is assumed to be 2.0 (that is, an LOS environment) in computation of deriving $B2(f_k)$, in a case where there is no PU system near an SU system to the extent to which an intersection area is not present between $B1(f_k)$ and $B2(f_k)$, obtaining $B2(f_k)$ at α=2.0 has no problem in terms of practical use. The radio wave propagation loss formula used in the description of Exemplary Embodiments 1 and 2 is only an example, and other radio wave propagation loss formulae may be used.

As mentioned above, the exemplary embodiments have been described with reference to the accompanying drawings, but the present disclosure is not limited to these embodiments. It is obvious that a person skilled in the art can conceive of various changes, modifications, replacements, additions, deletions, and equivalents within the category disclosed in the claims, and it is understood that they are also included in the technical scope of the present disclosure. Any combination of the respective constituent elements in the exemplary embodiments may occur within the scope without departing from the concept of the invention.

For example, first border B1 or second border B2 has been described to be defined as a border of a position where reception power becomes a reception sensitivity of PU system 1 or 1A, but it is also included in the technical scope of the present disclosure that first border B1 or second border B2 is defined as a border of a position where reception power becomes a value 10 dB smaller than a reception sensitivity of PU system 1 or 1A, and thus an interference margin of 10 dB is obtained.

The present disclosure is useful as a shared frequency management system and a shared frequency management method capable of easily managing permission of an SU system's use of at least some shared frequencies that are preferentially usable by a PU system without performing complicated interference computation, and thus suppressing a reduction in use efficiency of the shared frequencies.

What is claimed is:

1. A shared frequency management system that manages sharing of frequencies of a shared frequency band mainly used by a first wireless system with a second wireless system, the shared frequency management system comprising:
   an input unit that receives first border information regarding a first border indicating a border of a first region in which a reception level based on transmission of a first wireless signal using the frequencies of the shared frequency band from the first wireless system becomes a defined value;
   a deriving unit that derives second border information regarding a second border indicating a border of a second region in which a reception level based on transmission of a second wireless signal using the frequencies of the shared frequency band from the second wireless system becomes the defined value; and
   a permission condition determination unit that determines a sharing permission condition regarding the frequencies of the shared frequency band for the second wireless system on the basis of the first border information and the second border information.

2. The shared frequency management system of claim 1, wherein the permission condition determination unit determines the sharing permission condition for each of the frequencies of the shared frequency band.

3. The shared frequency management system of claim 1, wherein the deriving unit derives the second border information by using information regarding a communication method of the second wireless system, including reception power of the second wireless signal in a sensor provided around a local area in which the second wireless system is used.

4. The shared frequency management system of claim 1, wherein, in a case where the permission condition determination unit determines that an overlapping region is not present between the first region and the second region on the basis of the first border information and the second border information corresponding to any one specific frequency of the frequencies of the shared frequency band, the permission condition determination unit determines that the specific frequency is permitted to be used in a local area in which the second wireless system is used.

5. The shared frequency management system of claim 1, wherein, in a case where the permission condition determination unit determines that an overlapping region is present between the first region and the second region, and a receiver of the first wireless system is not disposed in the overlapping region, on the basis of the first border information and the second border information corresponding to any one specific frequency of the frequencies of the shared frequency band, the permission condition determination unit determines that the specific frequency is permitted to be used in a local area in which the second wireless system is used.

6. The shared frequency management system of claim 1, wherein, in a case where the permission condition determination unit determines that an overlapping region is present between the first region and the second region, and a receiver of the first wireless system is disposed in the overlapping region, on the basis of the first border information and the second border information corresponding to any one specific frequency of the frequencies of the shared frequency band, the permission condition determination unit determines that the specific frequency is permitted to be used in a local area in which the second wireless system is used assuming that transmission power of the second wireless signal in the local area is reduced by a predetermined amount.

7. The shared frequency management system of claim 1, further comprising:
   a second deriving unit that derives the first border information by using information regarding a communication method of the first wireless system.

8. The shared frequency management system of claim 7, further comprising:
   a geographic data holding unit that holds geographic information indicating topography and the presence or absence of a building of an area in which the first wireless signal is received,
   wherein the second deriving unit derives the first border information by using the information regarding the communication method of the first wireless system and the geographic information read from the geographic data holding unit.

9. The shared frequency management system of claim 7, further comprising:
   a notification unit that notifies the second wireless system of the sharing permission condition.

10. A shared frequency management method of managing sharing of frequencies of a shared frequency band mainly used by a first wireless system with a second wireless system, the shared frequency management method comprising:
    receiving first border information regarding a first border indicating a border of a first region in which a reception level based on transmission of a first wireless signal using the frequencies of the shared frequency band from the first wireless system becomes a defined value;
    deriving second border information regarding a second border indicating a border of a second region in which a reception level based on transmission of a second wireless signal using the frequencies of the shared frequency band from the second wireless system becomes the defined value; and determining a sharing permission condition regarding the frequencies of the shared frequency band for the second wireless system on the basis of the first border information and the second border information.

11. The shared frequency management method of claim 10, further comprising:

deriving the first border information by using information regarding a communication method of the first wireless system.

* * * * *